(12) United States Patent
Ishimatsu et al.

(10) Patent No.: US 8,197,968 B2
(45) Date of Patent: Jun. 12, 2012

(54) CATHODE ACTIVE MATERIAL AND BATTERY

(75) Inventors: Takahisa Ishimatsu, Fukushima (JP); Kei Yonezawa, Tokyo (JP); Takashi Sato, Fukushima (JP); Masumi Terauchi, Fukushima (JP); Yoshikatsu Yamamoto, Fukushima (JP)

(73) Assignee: Sony Corporation, Tokyo (JP)

( * ) Notice: Subject to any disclaimer, the term of this patent is extended or adjusted under 35 U.S.C. 154(b) by 1157 days.

(21) Appl. No.: 11/742,885

(22) Filed: May 1, 2007

(65) Prior Publication Data

US 2007/0275303 A1 Nov. 29, 2007

(30) Foreign Application Priority Data

May 26, 2006 (JP) ................................ 2006-147442

(51) Int. Cl.
*H01M 4/52* (2010.01)
(52) U.S. Cl. ............... 429/231.3; 429/221; 429/224; 429/231.2; 429/231.5; 423/594.6
(58) Field of Classification Search ............... 429/231.2, 429/231.3, 231.5, 231.95, 221, 224; 423/594.6
See application file for complete search history.

(56) References Cited

U.S. PATENT DOCUMENTS

| | | | |
|---|---|---|---|
| 6,805,996 B2 | 10/2004 | Hosoya | |
| 2002/0037456 A1 | 3/2002 | Hosoya | |
| 2006/0046142 A1* | 3/2006 | Kasai et al. | 429/223 |
| 2006/0078795 A1* | 4/2006 | Takahashi et al. | 429/231.3 |

FOREIGN PATENT DOCUMENTS

| | | |
|---|---|---|
| JP | 4-319260 | 11/1992 |
| JP | 9-139212 | 5/1997 |
| JP | 11016566 | * 1/1999 |
| JP | 2001-319652 | 11/2001 |
| JP | 2001319652 | 11/2001 |
| JP | 2003-45426 | 2/2003 |
| JP | 2004-47437 | 2/2004 |
| JP | 2004-311408 | 11/2004 |
| JP | 2004311408 | 11/2004 |
| JP | 2005-44785 | 2/2005 |
| JP | 2005-129489 | 5/2005 |
| JP | 2006-031987 | 2/2006 |
| JP | 2006-286603 | 10/2006 |
| WO | 2005/096416 | 10/2005 |

OTHER PUBLICATIONS

Journal of Power Sources: Performance of tin-containing thin-film anodes for rechargeable thin-film batteries, Lee et al., 2002, Elsevier p. 345-349.*
English Translation of JP 2006-031987, Feb. 2, 2006.*

* cited by examiner

*Primary Examiner* — Ula C Ruddock
*Assistant Examiner* — Frank Chernow
(74) *Attorney, Agent, or Firm* — K&L Gates LLP

(57) ABSTRACT

A cathode contains: a lithium cobalt composite oxide expressed by $Li_xCo_aM1_bM2_cO_2$, where M1 denotes the first element; M2 indicates the second element; x, a, b, and c are set to values within ranges of $0.9 \leq x \leq 1.1$, $0.9 \leq a \leq 1$, $0.001 \leq b \leq 0.05$, and $0.001 \leq c \leq 0.05$; and $a+b+c=1$; a first sub-component element of at least one kind selected from a group containing Ti, Zr, and Hf, and a second sub-component element of at least one kind selected from a group containing Si, Ge, and Sn. 0.01 mol % $\leq$ (content of the first sub-component element) $\leq$ 10 mol % as a ratio to cobalt in the lithium cobalt composite oxide. 0.01 mol % $\leq$ (content of the second sub-component element) $\leq$ 10 mol % as a ratio to cobalt in the lithium cobalt composite oxide.

8 Claims, 15 Drawing Sheets

CATHODE ACTIVE MATERIAL AND BATTERY

CROSS REFERENCES TO RELATED APPLICATIONS

The present application claims priority to Japanese Patent Application JP 2006-147442 filed in the Japanese Patent Office on May 26, 2006, the entire contents of which being incorporated herein by reference.

BACKGROUND

The present application relates to a cathode active material containing a lithium cobalt compound oxide containing lithium Li and cobalt Co and to a battery using the cathode active material.

In recent years, many portable electronic apparatuses have been developed and a secondary battery is occupying an important position as a power source of such an apparatus. Particularly, in recent years, the realization of a high capacitance and a light weight of the secondary battery is demanded. As a secondary battery which meets such a request, a lithium secondary battery using lithium as an electrode reactive substance has been put into practical use.

Lithium cobalt acid $LiCoO_2$ is widely used as a cathode active material of the lithium secondary battery. This is because lithium cobalt acid has a stratified structure which is advantageous to diffuse lithium ions, the structure is stable even for doping and dedoping of the lithium ions, and excellent characteristics can be obtained. However, in recent years, use in a wider temperature range and use at a large current are also requested, and a request for the characteristics becomes further severe.

Therefore, many trials for improving the characteristics by replacing cobalt in lithium cobalt acid by another element or by adding another element have been made. For example, in Patent Document 1 (JP-A-2001-319652), there has been disclosed a cathode active material whose stability at a high temperature can be improved by replacing a part of cobalt by a first element of at least one kind selected from a group containing aluminum Al, chromium Cr, vanadium V, manganese Mn, and iron Fe and a second element of at least one kind selected from a group containing magnesium Mg and calcium Ca. In Patent Document 2 (JP-A-2004-311408), there has been disclosed a cathode active material in which when lithium cobalt acid is synthesized, a zirconium compound is coprecipitated and zirconium Zr is allowed to exist on a particle surface of lithium cobalt acid, so that load characteristics, low-temperature characteristics, and thermal stability can be improved.

However, according to the cathode active material disclosed in Patent Document 1, although the high-temperature characteristics can be improved, it is difficult to obtain the satisfactory characteristics with respect to the load characteristics and the low-temperature characteristics. It is also requested to further improve the cycle characteristics. According to the cathode active material disclosed in Patent Document 2, although the thermal stability can be improved, it is difficult to obtain the characteristics near the characteristics which have been requested in recent years.

SUMMARY

It is, therefore, desirable to provide a cathode active material and a battery, in which load characteristics, low-temperature characteristics, and cycle characteristics at a high temperature can be improved.

According to an embodiment, there is provided a cathode active material containing:

a lithium cobalt composite oxide containing lithium Li, cobalt Co, a first element, and a second element;

a first sub-component element; and a second sub-component element, wherein the first element is at least one kind selected from a group containing aluminum Al, chromium Cr, vanadium V, manganese Mn, and iron Fe, the second element is at least one kind selected from a group containing magnesium Mg and calcium Ca, the first sub-component element is at least one kind selected from a group containing titanium Ti, zirconium Zr, and hafnium Hf, the second sub-component element is at least one kind selected from a group containing silicon Si, germanium Ge, and tin Sn, when a composition of cobalt is expressed as a, a composition of the first element as b, and a composition of the second element as c, mole ratios of cobalt, the first element, and the second element in the lithium cobalt composite oxide lie within ranges of $0.9 \leq a \leq 1$, $0.001 \leq b \leq 0.05$, and $0.001 \leq c \leq 0.05$, respectively, a content of the first sub-component element lies within a range from 0.01 mol % or more to 10 mol % or less as a ratio of the first sub-component element to cobalt in the lithium cobalt composite oxide, and a content of the second sub-component element lies within a range from 0.01 mol % or more to 10 mol % or less as a ratio of the second sub-component element to cobalt in the lithium cobalt composite oxide.

According to another embodiment, there is provided a battery comprising a cathode, an anode, and an electrolyte, wherein the cathode contains a cathode active material, the cathode active material contains a lithium cobalt composite oxide containing lithium Li, cobalt Co, a first element, and a second element, a first sub-component element, and a second sub-component element, the first element is at least one kind selected from a group containing aluminum Al, chromium Cr, vanadium V, manganese Mn, and iron Fe, the second element is at least one kind selected from a group containing magnesium Mg and calcium Ca, the first sub-component element is at least one kind selected from a group containing titanium Ti, zirconium Zr, and hafnium Hf, the second sub-component element is at least one kind selected from a group containing silicon Si, germanium Ge, and tin Sn, when a composition of cobalt is expressed as a, a composition of the first element as b, and a composition of the second element as c, mole ratios of cobalt, the first element, and the second element in the lithium cobalt composite oxide lie within ranges of $0.9 \leq a < 1$, $0.001 \leq b \leq 0.05$, and $0.001 \leq c \leq 0.05$, respectively, a content of the first sub-component element lies within a range from 0.01 mol % or more to 10 mol % or less as a ratio of the first sub-component element to cobalt in the lithium cobalt composite oxide, and a content of the second sub-component element lies within a range from 0.01 mol % or more to 10 mol % or less as a ratio of the second sub-component element to cobalt in the lithium cobalt composite oxide.

According to an embodiment, it is preferable that the lithium cobalt composite oxide is expressed by Formula 1.

$$Li_xCo_aM1_bM2_cO_2 \quad \text{(Formula 1)}$$

In Formula 1, M1 denotes the first element, M2 indicates the second element, x is set to a value within a range of $0.9 \leq x \leq 1.1$, a is set to a value within a range of $0.9 \leq a \leq 1$, b is set to a value within a range of $0.001 \leq b \leq 0.05$, c is set to a value within a range of $0.001 \leq c \leq 0.05$, and $a+b+c=1$).

According to an embodiment, it is preferable that at least some of the first sub-component element and the second sub-component element exists as a compound in a crystal grain boundary of the lithium cobalt composite oxide.

According to an embodiment, the cathode active material contains the lithium cobalt compound oxide containing the first element of the predetermined amount and the second element of the predetermined amount and also contains the first sub-component element of the predetermined amount and the second sub-component element of the predetermined amount. Therefore, the creation of the film of the cathode in the case where the charging and discharging have been repeated can be suppressed. Consequently, an increase in resistance of the cathode can be suppressed.

As described above, according to an embodiment, the cathode active material contains the lithium cobalt compound oxide containing the first element of the predetermined amount and the second element of the predetermined amount and also contains the first sub-component element of the predetermined amount and the second sub-component element of the predetermined amount. Therefore, the stability of the crystalline structure can be further improved. Even when the charging and discharging are repeated, the increase in resistance of the cathode can be suppressed. Consequently, the load characteristics, the low-temperature characteristics, and the cycle characteristics at the high temperature can be improved.

Additional features and advantages are described herein, and will be apparent from, the following Detailed Description and the figures.

DETAILED DESCRIPTION

Figure 1:
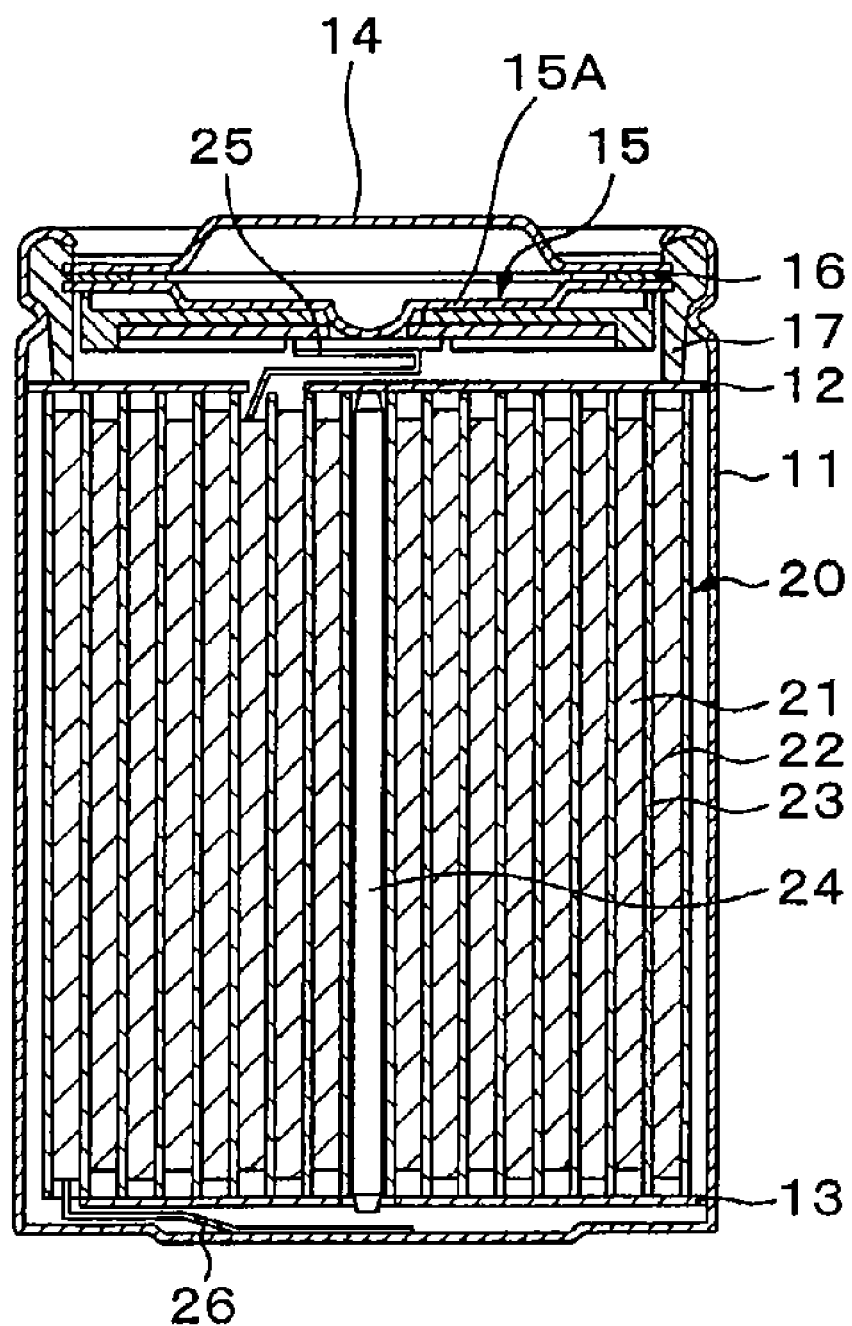
FIG. 1 is a cross sectional view showing a constructional example of a secondary battery according to an embodiment.

Embodiments will be described hereinbelow with reference to the drawings. In all of the drawings of the following embodiments, the same or corresponding portions are designated by the same reference numerals.

Cathode Active Material

A cathode active material according to a first embodiment is granular and contains a lithium cobalt compound oxide containing lithium and cobalt. In addition to lithium and cobalt, the lithium cobalt compound oxide further contains a first element of at least one kind selected from a group containing aluminum, chromium, vanadium, manganese, and iron and a second element of at least one kind selected from a group containing magnesium and calcium. This is because since the first element has a large coupling energy adapted to couple with oxygen, by containing the first element, a crystalline structure in the state where lithium has been dedoped therefrom can be strictly held, and by containing the second element, an electron conductivity can be improved.

When a composition of cobalt is expressed as a, a composition of the first element as b, and a composition of the second element as c, it is preferable that mole ratios of cobalt, the first element, and the second element in the lithium cobalt composite oxide lie within ranges of $0.9 \leq a \leq 1$, $0.001 \leq b \leq 0.05$, and $0.001 \leq c \leq 0.05$, respectively. If the content of cobalt increases, an adding effect is reduced. If the content of cobalt decreases, a charging/discharging capacitance decreases. If the content of the first element increases, a diffusion of lithium ions in the crystal is obstructed. If the content of the first element decreases, an effect of strictly holding the crystalline structure where lithium has been dedoped therefrom decreases. If the content of the second element increases, a destruction of the crystalline structure is promoted. If the content of the second element decreases, an conductivity improving effect decreases.

The cathode active material further contains a first sub-component element of at least one kind selected from a group containing titanium, zirconium, and hafnium and a second sub-component element of at least one kind selected from a group containing silicon, germanium, and tin.

At least a part of the first sub-component element exists in a crystal grain boundary of the lithium cobalt composite oxide, for example, as a compound containing oxygen, a compound containing oxygen and lithium, or the like. For example, if the cathode active material contains zirconium as a first sub-component element, at least a part of zirconium as a first sub-component element exists in the crystal grain boundary of the lithium cobalt composite oxide, for example, as a compound such as zirconium oxide, lithium zirconate, or the like. Thus, the crystalline structure of the lithium cobalt composite oxide can be further stabilized. The part of the first sub-component element may be solute in the lithium cobalt composite oxide or may exist in the surface of particles of the lithium cobalt composite oxide.

It is preferable that a content of the first sub-component element lies within a range from 0.01 mol % or more to 10 mol % or less as a ratio (first sub-component element/cobalt) of the first sub-component element to cobalt in the lithium cobalt composite oxide. This is because if the content of the first sub-component element is small, it is difficult to obtain a sufficient effect, and if the content of the first sub-component element is large, the capacitance decreases.

At least a part of the second sub-component element exists in the crystal grain boundary of the lithium cobalt composite oxide, for example, as a compound containing oxygen, a compound containing oxygen and lithium, or the like. For example, if the cathode active material contains tin as a second sub-component element, at least a part of tin as a second sub-component element exists in the crystal grain boundary of the lithium cobalt composite oxide, for example, as a compound such as tin oxide, lithium stannate, or the like. Thus, the crystalline structure of the lithium cobalt composite oxide can be further stabilized. The part of the second sub-component element may be solute in the lithium cobalt composite oxide or may exist in the surface of particles of the lithium cobalt composite oxide.

It is preferable that a content of the second sub-component element lies within a range from 0.01 mol % or more to 10 mol % or less as a ratio (second sub-component element/cobalt) of the second sub-component element to cobalt in the lithium cobalt composite oxide. This is because if the content of the second sub-component element is small, it is difficult to obtain a sufficient effect, and if the content of the second sub-component element is large, the capacitance decreases.

As for a particle size of the cathode active material, it is preferable that a value at a frequency 50% of a particle size distribution curve lies within a range from 5 µm or more to 30 µm or less. This is because if the particle size is too small, it is difficult to handle the cathode active material and, if the particle size is too large, a volume density which is obtained when an electrode is formed increases and load characteristics and low-temperature characteristics deteriorate. It is preferable that a specific surface area of the cathode active material lies within a range from 0.1 m$^2$/g or more to 1.5 m$^2$/g or less. This is because if the specific surface area is too small, reactivity deteriorates and the load characteristics and low-temperature characteristics deteriorate and, if the specific surface area is too large, the reactivity is too sensitive and a subreaction occurs severely.

A chemical formula of the lithium cobalt composite oxide is expressed by, for example, Formula 1.

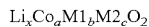  (Formula 1)

(In Formula 1, M1 denotes the first element, M2 indicates the second element, x is set to a value within a range of $0.9 \leq x \leq 1.1$, a is set to a value within a range of $0.9 \leq a \leq 1$, b is set to a value within a range of $0.001 \leq b \leq 0.05$, c is set to a value within a range of $0.001 \leq c \leq 0.05$, and a+b+c=1).

The cathode active material can be obtained as follows. For example, an alkali solution such as sodium hydrogencarbonate or the like is added into an acid solution in which a cobalt compound such as cobalt sulfate or the like, a compound containing the first sub-component element, and a compound containing the second sub-component element have been dissolved, the first sub-component element and the second sub-component element are coprecipitated together with a cobalt compound such as cobalt carbonate or the like, and thereafter, the cobalt compound such as cobalt carbonate or the like, a lithium compound such as lithium carbonate or the like, a compound containing the first element, and a compound containing the second element are mixed and baked.

Construction of Secondary Battery

An example of a construction of a secondary battery of the first embodiment will now be described.

FIG. 1 is a cross sectional view showing a constructional example of the secondary battery according to the first embodiment. According to the secondary battery, an open circuit voltage in a perfect charging state per pair of cathode and anode is set to, for example, 4.20V or a value over 4.20V. The open circuit voltage which is set to the value over 4.20V lies within, for example, a range from 4.25V or more to 4.60V or less or a range from 4.25V or more to 6.00V or less.

The secondary battery is what is called a cylindrical type and has a winded electrode member 20 in which a belt-shaped cathode 21 and a belt-shaped anode 22 have been wound through a separator 23 in an almost hollow cylindrical battery can 11. The battery can 11 is made of iron Fe plated with, for example, nickel Ni. One end portion of the battery can 11 is closed and the other end portion is open. A pair of insulating plates 12 and 13 are arranged in the battery can 11 so as to be perpendicular to the winded peripheral surface so as to sandwich the winded electrode member 20, respectively.

A battery cap 14, a relief valve mechanism 15, and a thermally-sensitive resistive (PTC: Positive Temperature Coefficient) element 16 provided in the battery cap 14 are attached to the open end portion of the battery can 11 by being caulked through a gasket 17. The inside of the battery can 11 is sealed. The battery cap 14 is made of, for example, a material similar to that of the battery can 11. The relief valve mechanism 15 is electrically connected to the battery cap 14 through the PTC element 16. When an inner pressure of the battery rises to a predetermined value or more by an internal short-circuit, heating from the outside, or the like, a disk plate 15A of the relief valve mechanism 15 is reversed, thereby disconnecting the electric connection between the battery cap 14 and the winded electrode member 20. When a temperature rises, the PTC element 16 limits a current by an increase in resistance value, thereby preventing an abnormal heat generation that is caused by the large current. The gasket 17 is made of, for example, an insulating material and its surface is coated with asphalt.

The winded electrode member 20 is wound around, for example, a center pin 24 as a center. A cathode lead 25 made of aluminum Al or the like is connected to the cathode 21 of the winded electrode member 20. An anode lead 26 made of nickel Ni or the like is connected to the anode 22. The cathode lead 25 is welded to the relief valve mechanism 15, so that it is electrically connected to the battery cap 14. The anode lead 26 is welded to the battery can 11 and is electrically connected thereto.

Figure 2:
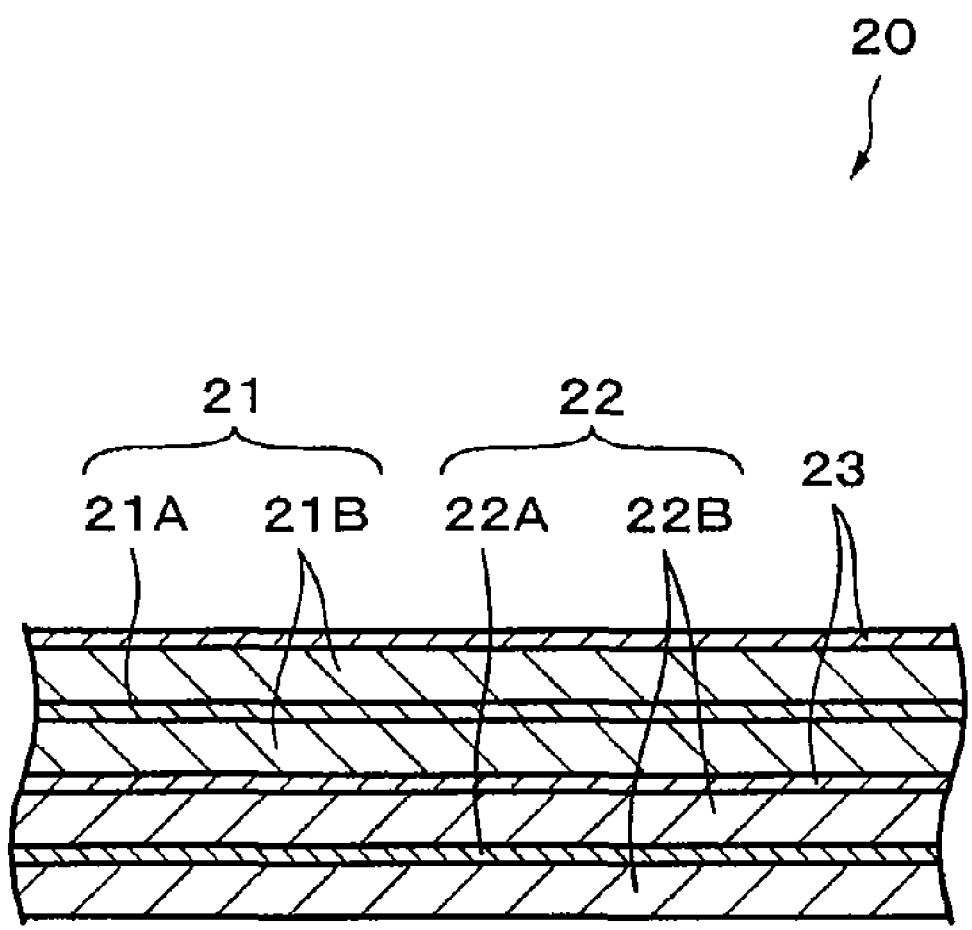
FIG. 2 is a cross sectional view enlargedly showing a part of a winded electrode member 20 shown in FIG. 1.

FIG. 2 is a cross sectional view enlargedly showing a part of the winded electrode member 20 shown in FIG. 1. The winded electrode member 20 is obtained by laminating the cathode 21 and the anode 22 through the separator 23 and wound.

The cathode 21 has, for example, a cathode collector 21A and cathode active material layers 21B provided on both surfaces of the cathode collector 21A. The cathode collector 21A is made of, for example, a metal foil such as an aluminum foil or the like.

The cathode active material layer 21B includes: the cathode active material according to the first embodiment; and a conductive material such as a carbon material or the like and a binder such as polyvinylidene fluoride, polytetrafluoro ethylene, or the like as necessary. Thus, according to the secondary battery, the crystalline structure of the cathode active material is further stabilized, the load characteristics and the low-temperature characteristics can be improved, and the cycle characteristics at a high temperature can be improved. The composition x of lithium shown in Formula 1 is set to the value obtained upon assembling, that is, at the time of the perfect discharging.

In addition to the cathode active material according to the first embodiment, the cathode active material layer 21B may also include another cathode active material by mixing it. As another cathode active material, for example, a lithium nickel composite oxide containing lithium and nickel, a lithium manganese composite oxide containing lithium and manganese and having a spinel structure, or a phosphate compound containing lithium and iron can be mentioned. It is preferable that the lithium nickel composite oxide contains, for example, cobalt in addition to lithium and nickel. It is further preferable to contain the first element of the lithium cobalt compound oxide. It is preferable that a ratio of the cathode active material according to the first embodiment is set to be 10 mass % or more of the whole cathode active material. This is because the more advanced characteristics can be obtained.

It is preferable that a volume density of the cathode active material layer 21B lies within a range from 2.0 g/cm$^3$ or more to 4.0 g/cm$^3$ or less. This is because if the volume density is small, a capacitance per unit volume decreases and, if the volume density is large, a permeability of an electrolytic solution deteriorates and the load characteristics and the low-temperature characteristics deteriorate.

In a manner similar to the cathode 21, the anode 22 has, for example, an anode collector 22A and an anode active material layers 22B provided on both surfaces of the anode collector 22A. The anode collector 22A is made of, for example, a metal foil such as a copper foil or the like.

The anode active material layer 22B is formed so as to contain one or two or more kinds of anode materials in/from which lithium can be doped and dedoped as an anode active material. The anode active material layer 22B may contain a conductive material and a binder as necessary.

As an anode material in/from which lithium can be doped and dedoped, for example, a carbon material such as graphite, non-easy-graphitizable carbon, easy-graphitizable carbon, or the like can be mentioned. In the carbon material, any one kind of elements can be solely used, two or more kinds of elements may be mixed and used, or two or more kinds of elements having different mean diameters can be also mixed and used.

As an anode material in/from which lithium can be doped and dedoped, a material containing a metal element which can form an alloy together with lithium or a semimetal element as a component element can be mentioned. Specifically speaking, a simple substance, an alloy, or a compound of a metal element which can form an alloy together with lithium, a simple substance, an alloy, or a compound of a semimetal element which can form an alloy together with lithium, or a material having phases of one or two or more kinds of them in at least a part can be mentioned.

As such a metal element or a semimetal element, for example, the following elements can be mentioned: tin Sn; lead Pb; aluminum; indium In; silicon Si; zinc Zn; antimony Sb; bismuth Bi; cadmium Cd; magnesium; boron B; gallium Ga; germanium Ge; arsenic As; silver Ag; zirconium; yttrium Y; or hafnium Hf. Among them, a metal element or a semi-metal element of Group 14 in a long period type periodic table is preferable. Silicon or tin is particularly preferable. This is because in the case of silicon or tin, an ability of doping and dedoping lithium is high and a high energy density can be obtained.

As an alloy of silicon, for example, an alloy containing at least one kind selected from a group containing tin, nickel, copper, iron, cobalt, manganese, zinc, indium, silver, titanium Ti, germanium, bismuth, antimony, and chromium can be mentioned as a second component element other than silicon. As an alloy of tin, for example, an alloy containing at least one kind selected from a group containing silicon, nickel, copper, iron, cobalt, manganese, zinc, indium, silver, titanium, germanium, bismuth, antimony, and chromium can be mentioned as a second component element other than tin.

As a compound of silicon or a compound of tin, for example, a compound containing oxygen O or carbon C can be mentioned. In addition to silicon or tin, the foregoing second component element can be also contained.

As a separator 23, any material can be used so long as it is electrically stable, is chemically stable against the cathode active material, anode active material, or a solvent, and does not have electric conductivity. For example, a high molecular nonwoven fabric cloth, a porous film, or a paper-like sheet made of fiber of glass or ceramics can be used, or a sheet obtained by laminating a plurality of those materials can be also used. Particularly, it is preferable to use a porous polyolefin film. A material obtained by combining such a film with a heat-resistant material made of fiber of polyimide, glass, or ceramics, or the like.

The electrolytic solution contains an electrolytic salt and a solvent which dissolves the electrolytic salt. As an electrolytic salt, for example, lithium salt such as $LiClO_4$, $LiPF_6$, $LiBF_4$, $LiN(SO_2CF_3)_2$, $LiN(SO_2C_2F_5)_2$, $LiAsF_6$, or the like can be mentioned. Although any one kind of them can be used as an electrolytic salt, two or more kinds of them may be used.

As a solvent, for example, the following solvents can be mentioned: a lactone system solvent such as γ-butyrolactone, γ-valerolactone, δ-valerolactone, ε-caprolactone, or the like; a carbonic ester system solvent such as ethylene carbonate, propylene carbonate, butylene carbonate, vinylene carbonate, dimethyl carbonate, ethylmethyl carbonate, diethyl carbonate, or the like; an ether system solvent such as 1,2-dimethoxy ethane, 1-ethoxy-2-methoxy ethane, 1,2-diethoxy ethane, tetrahydrofuran, 2-methyl tetrahydrofuran, or the like; a nitrile system solvent such as acetonitrile or the like; a sulforan system solvent; a phosphoric ester solvent of a phosphate class or the like; or a non-aqueous solvent of a pyrolidone class or the like. Any one kind of those solvents can be solely used as a solvent or two or more kinds of them can be also mixed and used.

Manufacturing Method of Secondary Battery

An example of a manufacturing method of the secondary battery according to the first embodiment will now be described.

The cathode 21 is manufactured as follows. First, a cathode mixture is adjusted by mixing the cathode active material, a conductive material, and a binder. The cathode mixture is dispersed into the solvent such as 1-methyl-2-pyrolidone or the like, thereby forming a cathode mixture slurry. Subsequently, the cathode collector 21A is coated with the cathode mixture slurry and the solvent is dried and, thereafter, compression-molded by a roll pressing machine or the like, thereby forming the cathode active material layers 21B and obtaining the cathode 21.

The anode 22 is manufactured as follows. First, an anode mixture is adjusted by mixing the anode active material and a binder. The anode mixture is dispersed into the solvent such as 1-methyl-2-pyrolidone or the like, thereby forming an anode mixture slurry. Subsequently, the anode collector 22A is coated with the anode mixture slurry and the solvent is dried and, thereafter, compression-molded by the roll pressing machine or the like, thereby forming the anode active material layers 22B and obtaining the anode 22.

Subsequently, the cathode lead 25 is attached to the cathode collector 21A by welding or the like and the anode lead 26 is attached to the anode collector 22A by welding or the like. Thereafter, the cathode 21 and the anode 22 are wound through the separator 23. A front edge portion of the cathode lead 25 is welded to the relief valve mechanism 15 and a front edge portion of the anode lead 26 is welded to the battery can 11. The wound cathode 21 and anode 22 are sandwiched between the pair of insulating plates 12 and 13 and enclosed in the battery can 11. After the cathode 21 and the anode 22 were enclosed in the battery can 11, an electrolyte is injected into the battery can 11 and impregnated into the separator 23. Thereafter, the battery cap 14, relief valve mechanism 15, and PTC element 16 are fixed to the open edge portion of the battery can 11 by being caulked through the gasket 17. In this manner, the secondary battery shown in FIG. 1 is manufactured.

According to such a secondary battery, when it is charged, for example, lithium ions are dedoped from the cathode 21 and doped into the anode 22 through the electrolytic solution. On the other hand, when the battery is discharged, for example, lithium ions are dedoped from the anode 22 and doped into the cathode 21 through the electrolytic solution. At this time, since the cathode active material according to the first embodiment is contained in the cathode 21, the stability of the crystalline structure is improved and the doping and dedoping of lithium are smoothly performed.

As mentioned above, according to the first embodiment, the cathode active material contains the lithium cobalt compound oxide containing the first element of the predetermined amount and the second element of the predetermined amount and also contains the first sub-component element of the predetermined amount and the second sub-component element of the predetermined amount. Therefore, the stability of the crystalline structure can be further improved. Consequently, the load characteristics and the low-temperature characteristics can be improved and the cycle characteristics at the high temperature can be also improved.

Particularly, if a particle size at a frequency 50% of a particle size distribution curve is set to a value within a range from 5 μm or more to 30 μm or less and a specific surface area is set to a value within a range from 0.1 $m^2/g$ or more to 1.5 $m^2/g$ or less, a higher effect can be obtained.

Even in the battery of a high charging voltage in which the open circuit voltage in the perfect charging state per pair of cathode and anode exceeds 4.2V, in a manner similar to the battery whose open circuit voltage is equal to 4.2V, the load characteristics and the low-temperature characteristics can be improved and the cycle characteristics at the high temperature can be also improved.

Cathode Active Material

Since a cathode active material according to a second embodiment is similar to that in the foregoing first embodiment, its explanation is omitted here.

Construction of Secondary Battery

An example of a construction of the secondary battery according to a second embodiment will now be described.

Figure 3:
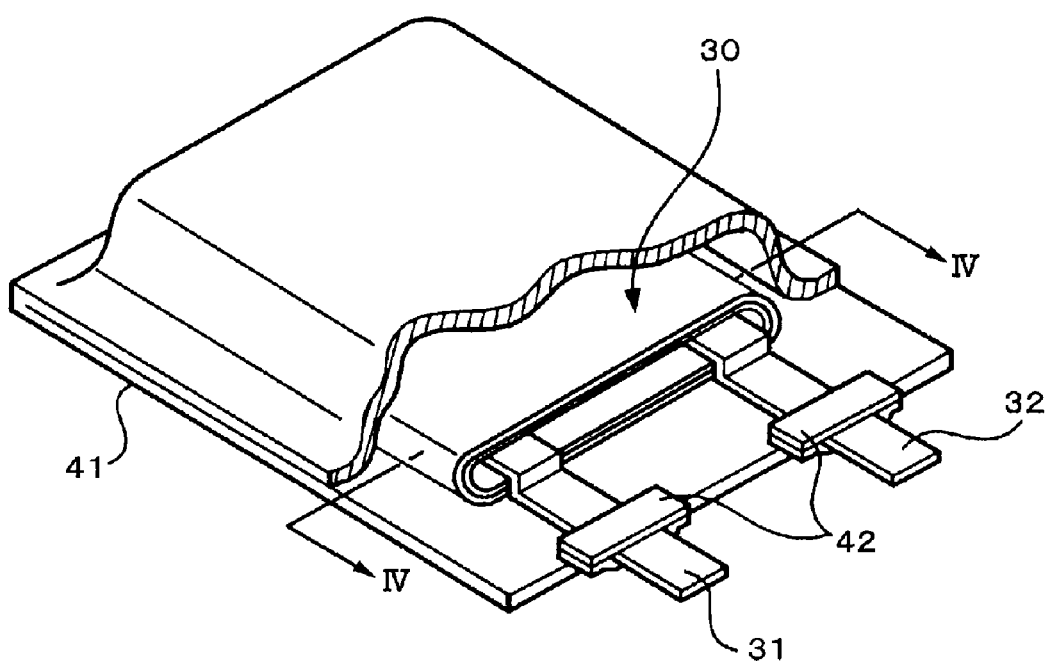
FIG. 3 is a perspective view showing a constructional example of a secondary battery according to an embodiment.

FIG. 3 is a cross sectional view showing a constructional example of the secondary battery according to the second embodiment. The secondary battery has a construction in which a battery element 30 to which a cathode lead 31 and an anode lead 32 have been attached is enclosed in a film-like sheathing member 41. According to the secondary battery, an open circuit voltage in a perfect charging state per pair of cathode and anode is set to, for example, 4.20V or a value over 4.20V. The open circuit voltage which is set to the value over 4.20V lies within, for example, a range from 4.25V or more to 4.60V or less or a range from 4.25V or more to 6.00V or less.

The cathode lead 31 and the anode lead 32 are, for example, in a strip-like shape and are led out, for example, in the same direction from the inside of the sheathing member 41 toward the outside, respectively. The cathode lead 31 is made of a metal material such as aluminum Al or the like. The anode lead 32 is made of a metal material such as nickel Ni or the like.

The sheathing member 41 has a structure in which, for example, an insulating layer, a metal layer, and an outermost layer are laminated in this order and adhered by a laminating process or the like. The sheathing member 41 is formed in such a manner that the insulating layer side is set to the inside and outer edge portions are melt-bonded or mutually adhered with an adhesive agent.

The insulating layer is made of, for example, a polyolefin resin such as polyethylene, polypropylene, denatured polyethylene, denatured polypropylene, their copolymer, or the like. This is because moisture permeability can be lowered and it is excellent in air-tightness. The metal layer is made of foil-shaped or plate-shaped aluminum, stainless steel, nickel, iron, or the like. The outermost layer can be made of, for example, a resin similar to that of the insulating layer or may be made of nylon or the like. This is because an intensity against a tear, piercing, or the like can be enhanced. The sheathing member 41 may have a layer other than the insulating layer, the metal layer, and the outermost layer.

An adhesive film 42 for improving adhesion between each of the cathode lead 31 and the anode lead 32 and the inside of the sheathing member 41 and preventing invasion of the outside atmosphere has been inserted between the sheathing member 41 and each of the cathode lead 31 and the anode lead 32. The adhesive film 42 is made of a material having adhesion against each of the cathode lead 31 and the anode lead 32. For example, if the cathode lead 31 and the anode lead 32 are made of the foregoing metal material, it is preferable that they are made of the polyolefin resin such as polyethylene, polypropylene, denatured polyethylene, denatured polypropylene, or the like.

Figure 4:
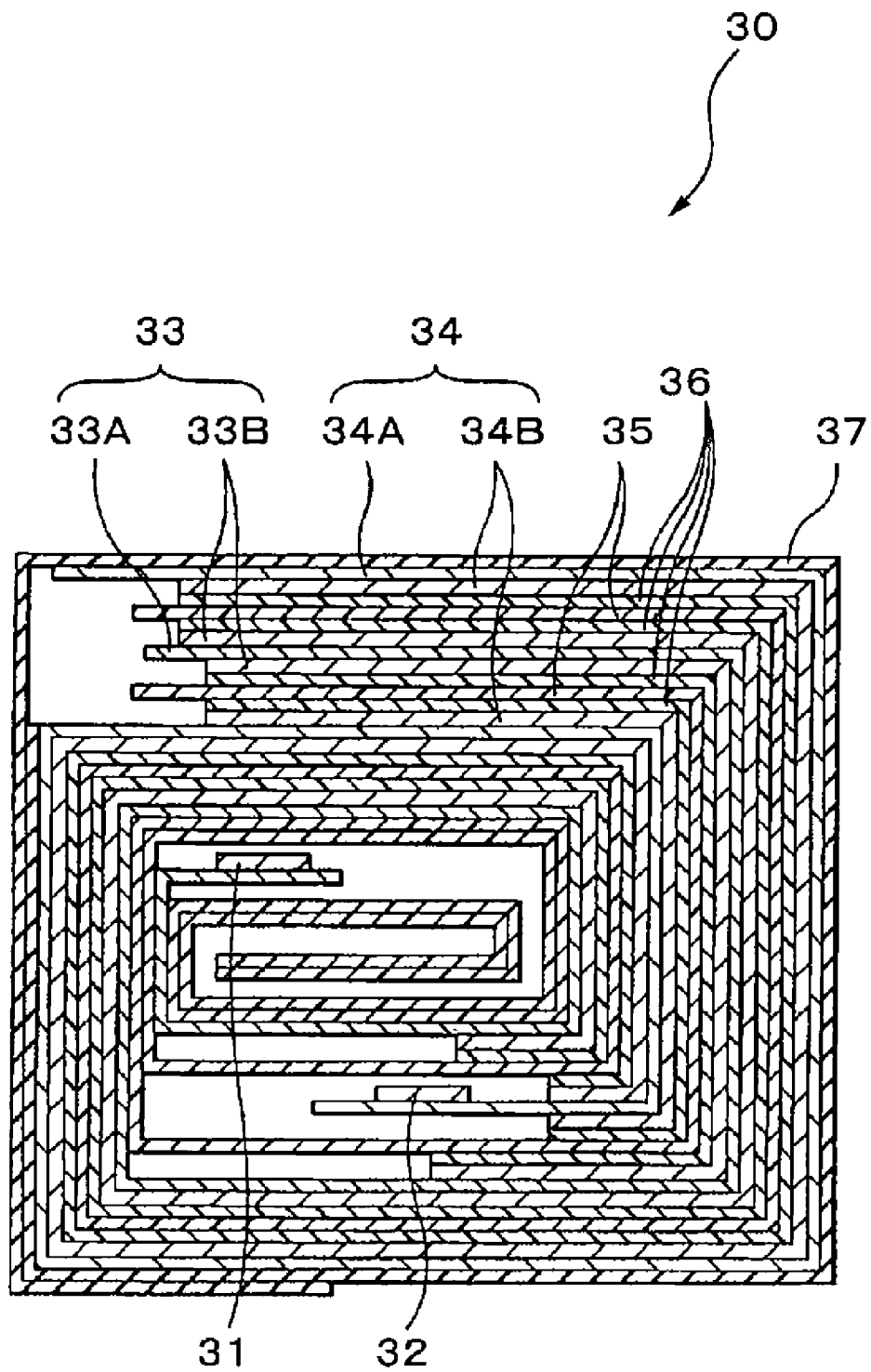
FIG. 4 is a cross sectional view taken along the line IV-IV in a battery element shown in FIG. 3.

FIG. 4 is a cross sectional view taken along the line IV-IV in the battery element 30 shown in FIG. 3. The battery element 30 is formed by laminating a cathode 33 and an anode 34 through a separator 35 and an electrolyte 36 and winding them. An outermost peripheral portion of the battery element 30 is protected by a protecting tape 37.

The cathode 33 has, for example, a cathode collector 33A and cathode active material layers 33B provided on both surfaces of the cathode collector 33A. The cathode 34 has, for example, an anode collector 34A and anode active material layers 34B provided on both surfaces of the anode collector 34A. Constructions of the cathode collector 33A, cathode active material layers 33B, anode collector 34A, anode active material layers 34B, and separator 35 are similar to those of the cathode collector 21A, cathode active material layers 21B, anode collector 22A, anode active material layers 22B, and separator 23.

The electrolyte 36 contains an electrolytic solution and a holding member including a high molecular compound for holding the electrolytic solution. The electrolyte 36 is in what is called a gel state. A construction of the electrolytic solution (that is, solvent, electrolytic salt, or the like) is similar to that in the foregoing first embodiment.

The high molecular compound may be a compound which absorbs the solvent and becomes a gel state. For example, the following compounds can be mentioned: a fluorine system high molecular compound such as polyvinylidene fluoride, copolymer of vinylidene fluoride and hexafluoro propylene, or the like; an ether system high molecular compound such as polyethylene oxide, bridge member containing polyethylene oxide, or the like; a compound containing polyacrylo nitrile, polypropylene oxide, or polymethyl methacrylate as a repetitive unit; and the like. As a high molecular compound, any one kind of those compound can be solely used or two or more kinds of them may be mixed and used.

Particularly, the fluorine system high molecular compound is preferable from a viewpoint of the oxidation-reduction stability. Among them, the copolymer containing vinylidene fluoride and hexafluoro propylene as components is preferable. Further, the copolymer may contain the following material as a component: monoester of unsaturated dibasic acid such as monomethyl maleic acid or the like; ethylene halide such as ethylene chloride trifluoride or the like; cyclic carbonic ester of an unsaturated compound such as vinylene carbonate or the like; acrylvinyl monomer containing an epoxy radical; or the like. This is because the advanced characteristics can be obtained.

Manufacturing Method of Secondary Battery

An example of a manufacturing method of the secondary battery according to the second embodiment will now be described.

First, the cathode active material layer 33B is formed on the cathode collector 33A, thereby manufacturing the cathode 33. The cathode active material layer 33B is formed as follows. For example, a cathode mixture is adjusted by mixing powder of the cathode active material, a conductive material, and a binder. Thereafter, the cathode mixture is dispersed into the solvent such as N-methyl-2-pyrolidone or the like, thereby forming a paste-like cathode mixture slurry. The cathode collector 33A is coated with the cathode mixture slurry and the solvent is dried and, thereafter, compression-molded. For example, in a manner similar to the cathode 33, the anode active material layer 34B is formed on the anode collector 34A, thereby manufacturing the anode 34. Subsequently, the cathode lead 31 is attached to the cathode collector 33A and the anode lead 32 is attached to the anode collector 34A.

Subsequently, an electrolytic solution and a high molecular compound are mixed by using a mixing solvent. The upper surface of the cathode active material layer 33B and the upper surface of the anode active material layer 33B are coated with the mixed solution and the mixing solvent is volatilized, thereby forming the electrolyte 36. Subsequently, the cathode 33, separator 35, anode 34, and separator 35 are sequentially laminated and wound. The protecting tape 37 is adhered to the outermost peripheral portion, thereby forming the battery element 30. After that, the battery element 30 is sandwiched between the sheathing members 41 and the outer edge portions of the sheathing members 41 are thermally melt-bonded. In this instance, the adhesive films 42 are inserted between the cathode lead 31 and the sheathing member 41 and between the anode lead 32 and the sheathing member 41, respectively. Thus, the secondary battery shown in FIGS. 3 and 4 are obtained.

The present application is not limited to the structure in which after the electrolyte 36 was formed on the cathode 33 and the anode 34, they are wound. It is also possible to use a structure in which after the cathode 33 and the anode 34 were wound through the separator 35 and they are sandwiched between the sheathing members 41, an electrolytic composition containing an electrolytic solution and a monomer of a high molecular compound is injected, and the monomer is polymerized in the sheathing member 41.

According to such a secondary battery, when it is charged, for example, lithium ions are dedoped from the cathode 33 and doped into the anode 34 through the electrolyte 36. On the other hand, when the battery is discharged, for example, lithium ions are dedoped from the anode 34 and doped into the cathode 33 through the electrolyte 36. At this time, since the cathode active material according to the second embodiment is contained in the cathode 33, the stability of the crystalline structure is improved and the doping and dedoping of lithium are smoothly performed.

According to the second embodiment, an effect similar to that in the first embodiment mentioned above can be obtained.

Third Embodiment

A third embodiment will now be described. According to a secondary battery of the third embodiment, an electrolytic solution is used in place of the gel-like electrolyte 36 in the secondary battery of the second embodiment. In this case, the electrolytic solution is impregnated into the separator 35. As an electrolytic solution, an electrolytic solution similar to that in the first embodiment mentioned above can be used.

The secondary battery having such a construction can be manufactured, for example, as follows.

In a manner similar to that in the second embodiment mentioned above except that the process for forming the gel-like electrolyte 36 is omitted, the cathode 33 and the anode 34 are wound, the battery element 30 is manufactured, the battery element 30 is sandwiched between the sheathing members 41, thereafter, the electrolytic solution is injected therein, and the sheathing members 41 are sealed.

According to the third embodiment, an effect similar to that in the first embodiment mentioned above can be obtained.

EXAMPLES

Specific Examples of the application will be further described in detail with reference to the drawings.

Examples 1-1 to 1-3

First, cobalt sulfate, zirconium sulfate, and tin sulfate are dissolved into pure water. A sodium hydrogencarbonate solution is added. Zirconium and tin are coprecipitated together with cobalt carbonate. In this instance, mixture ratios of cobalt sulfate, zirconium sulfate, and tin sulfate are adjusted. A ratio of zirconium to cobalt is set to 0.01 mol %. A ratio of tin to cobalt is changed within a range from 0.01 mol % to 10 mol %.

Subsequently, cobalt carbonate in which zirconium and tin have been coprecipitated, lithium carbonate, aluminum hydroxide, and magnesium carbonate are mixed and baked, so that the cathode active material is obtained. In this instance, in Examples 1-1 to 1-3, they are mixed so that mole ratios of (lithium:cobalt:aluminum:magnesium), that is, (x:a:b:c) in Formula 1 are equal to (0.962:0.98:0.01:0.01). A quantitative analysis is performed by an atomic absorption analyzing method with respect to the obtained cathode active materials of Examples, so that it has been confirmed that the materials of almost the target compositions were obtained.

Subsequently, the obtained powder cathode active material of 92 mass %, powder polyvinylidene fluoride of 3 mass % as a binder, and powder graphite of 5 mass % as a conductive material, are kneaded by using N-methyl-2-pyrolidone as a solvent, thereby forming the cathode mixture slurry. Subsequently, both surfaces of the cathode collector 33A made of the aluminum foil are uniformly coated with the cathode mixture slurry, the slurry is dried, and thereafter, it is dried in a reduced pressure state. Subsequently, the collector is compression-molded by the roll pressing machine, thereby forming the cathode active material layers 33B and manufacturing the cathode 33. Thereafter, the cathode lead 31 made by an aluminum ribbon is welded to the edge portion of the cathode 33.

Mesophase system spherical graphite of 90 mass % as an anode active material and powder polyvinylidene fluoride of 10 mass % as a binder are kneaded by using N-methyl-2-pyrolidone as a solvent, thereby forming the anode mixture slurry. Subsequently, both surfaces of the anode collector 34A made of the copper foil are uniformly coated with the anode mixture slurry, the slurry is dried, and thereafter, it is dried in a reduced pressure state. Subsequently, the collector is compression-molded by the roll pressing machine, thereby forming the anode active material layers 34B and manufacturing the anode 34. Thereafter, the anode lead 32 made by a nickel ribbon is welded to the edge portion of the anode 34.

Subsequently, ethylene carbonate EC of 12.5 weight %, ethyl methyl carbonate EMC of 12.5 weight %, and $LiPF_6$ as an electrolytic salt of 5 weight % are mixed, thereby adjusting a plasticizer. A block copolymer (vinylidene fluoride-co-hexafluoro propylene) of 10 weight % whose molecular weight is equal to 600000 and diethyl carbonate of 60 weight % are mixed to the plasticizer and dissolved. Then, both surfaces of the cathode 33 and the anode 34 are uniformly coated with the dissolved mixture material and this material is impregnated. By leaving this mixture material for eight hours at a normal room temperature, diethyl carbonate is vaporized and removed, thereby forming the gel electrolytic layer 36.

Subsequently, the cathode 33 and anode 34 on which the gel electrolytic layers 36 have been formed as mentioned above and the separator 35 made of a porous polyethylene film are laminated in order of the anode 34, separator 35, cathode 33, and separator 35. This laminate body is wrapped around a flat plate core a number of times. Thereafter, the protecting tape 37 is adhered to the outermost peripheral portion, thereby manufacturing the battery element 30.

Finally, the battery element 30 manufactured in this manner is sandwiched between the sheathing members 41 made of the aluminum laminate films obtained by sandwiching the aluminum foil between the polyolefin films. The outer peripheral edge portions of the sheathing members 41 are thermally melt-bonded. In this instance, the adhesive films 42 are inserted between the cathode lead 31 and the sheathing member 41 and between the anode lead 32 and the sheathing member 41, respectively. Thus, the target secondary battery is manufactured.

Examples 2-1 to 2-3

The secondary batteries are manufactured in a manner similar to Examples 1-1 to 1-3 except that the ratio of zirconium to cobalt is set to 10 mol %.

Examples 3-1 to 3-3

The secondary batteries are manufactured in a manner similar to Examples 1-1 to 1-3 except that the mole ratios of (lithium:cobalt:aluminum:magnesium), that is, (x:a:b:c) in Formula 1 are set to (0.962:0.989:0.001:0.01) and the ratio of zirconium to cobalt is set to 2 mol %.

Examples 4-1 to 4-3

The secondary batteries are manufactured in a manner similar to Examples 1-1 to 1-3 except that the mole ratios of (lithium:cobalt:aluminum:magnesium), that is, (x:a:b:c) in Formula 1 are set to (0.962:0.94:0.05:0.01) and the ratio of zirconium to cobalt is set to 2 mol %.

Examples 5-1 to 5-3

The secondary batteries are manufactured in a manner similar to Examples 1-1 to 1-3 except that the mole ratios of (lithium:cobalt:aluminum:magnesium), that is, (x:a:b:c) in Formula 1 are set to (0.962:0.989:0.01:0.001) and the ratio of zirconium to cobalt is set to 2 mol %.

Examples 6-1 to 6-3

The secondary batteries are manufactured in a manner similar to Examples 1-1 to 1-3 except that the mole ratios of (lithium:cobalt:aluminum:magnesium), that is, (x:a:b:c) in Formula 1 are set to (0.962:0.94:0.01:0.05) and the ratio of zirconium to cobalt is set to 2 mol %.

Comparisons 1-1 to 1-4

The secondary batteries are manufactured in a manner similar to Examples 1-1 to 1-3 except that the mole ratios of (lithium:cobalt:aluminum:magnesium), that is, (x:a:b:c) in Formula 1 are set to (0.962:0.98:0.01:0.01), the ratio of zirconium to cobalt is set to 2 mol %, and the ratio of tin to cobalt is changed to a value out of a range from 0 mol % to 12 mol %.

Comparisons 2-1 to 2-3

The secondary batteries are manufactured in a manner similar to Examples 1-1 to 1-3 except that the mole ratios of (lithium:cobalt:aluminum:magnesium), that is, (x:a:b:c) in Formula 1 are set to (0.962:0.98:0.01:0.01) and the ratio of zirconium to cobalt is set to 0 mol %.

Comparisons 3-1 to 3-3

The secondary batteries are manufactured in a manner similar to Examples 1-1 to 1-3 except that the mole ratios of (lithium:cobalt:aluminum:magnesium), that is, (x:a:b:c) in Formula 1 are set to (0.962:0.98:0.01:0.01) and the ratio of zirconium to cobalt is set to 20 mol %.

Charging and discharging are executed with respect to the secondary batteries of Examples and Comparisons obtained as mentioned above and a first charging/discharging efficiency, a first discharging capacitance, load characteristics, low-temperature characteristics, and cycle characteristics at 50° C. are evaluated. Evaluation results are shown in Table 1 and FIGS. 5 to 13. The first discharging capacitance is shown as a relative value on the assumption that the value in Comparison 2-1 is equal to 100.

The first charging/discharging efficiency is obtained by the following equation (1). That is, the constant current constant voltage charging is executed at 23° C., an upper limit voltage of 4.2V, and a current of 1 C until the total of a charging time reaches three hours, thereafter, the constant current discharging is executed at 23° C., a current of 0.2 C, and a final voltage of 3V, and the first charging/discharging efficiency is obtained from the charging capacitance and the discharging capacitance at that time. "1 C" denotes a current value by which a theoretical capacitance can be completely discharged within 1 hour. "0.2 C" denotes a current value by which a theoretical capacitance can be completely discharged within 5 hours.

First charging/discharging efficiency (%)=(first discharging capacitance/first charging capacitance)×100 (1)

The load characteristics are obtained by the following equation (2) from the discharging capacitance obtained when the constant current discharging is executed at 23° C., a current of 0.2 C, and a final voltage of 3V and the discharging capacitance obtained when the constant current discharging is executed at 23° C., a current of 3 C, and a final voltage of 3V. At this time, the constant current constant voltage charging is executed at 23° C., an upper limit voltage of 4.2V, and a current of 1 C until the total of the charging time reaches three hours. "3 C" denotes a current value by which a theoretical capacitance can be completely discharged within 20 minutes.

Load characteristics (%)=(discharging capacitance at current 3 C/discharging capacitance at current 0.2 C)×100 (2)

The low-temperature characteristics are obtained by the following equation (3) from the discharging capacitance obtained when the constant current discharging is executed at 23° C., a current of 0.5 C, and a final voltage of 3V and the discharging capacitance obtained when the constant current discharging is executed at −20° C., a current of 0.5 C, and a final voltage of 3V. At this time, the constant current constant voltage charging is executed at 23° C., an upper limit voltage of 4.2V, and a current of 1 C until the total of the charging time reaches three hours. "0.5 C" denotes a current value by which a theoretical capacitance can be completely discharged within 2 hours.

Low-temperature characteristics (%)=(discharging capacitance at −20° C./discharging capacitance at 23° C.)×100 (3)

The cycle characteristics at 50° C. are obtained by the following equation (4). That is, the constant current constant voltage charging is executed at 50° C., an upper limit voltage of 4.2V, and a current of 1 C until the total of the charging time reaches three hours, thereafter, the constant current discharging is executed at 50° C., a current of 1 C, and a final voltage of 3V, and the cycle characteristics at 50° C. are obtained from the discharging capacitance at the first cycle and the discharging capacitance at the 300th cycle.

Cycle characteristics (%)=(discharging capacitance at the 300th cycle/discharging capacitance at the 1st cycle)×100 (4)

Table 1 shows the compositions of the cathode active materials of Examples 1-1 to 6-3 and Comparisons 1-1 to 3-3 and evaluation results of the characteristics of those materials, respectively.

TABLE 1

| | Al COMPOSITION b | Mg COMPOSITION c | Zr/Co (mol %) | Sn/Co (mol %) | 1ST CHARGING/ DISCHARGING EFFICIENCY (%) | 1ST DISCHARGING CAPACITANCE (RELATIVE VALUE) | LOAD CHARACTERISTICS (%) | LOW-TEMPERATURE CHARACTERISTICS (%) | 50° C. CYCLE CHARACTERISTICS (%) |
|---|---|---|---|---|---|---|---|---|---|
| EXAMPLE 1-1 | 0.01 | 0.01 | 0.01 | 0.01 | 92 | 99 | 97 | 80 | 85 |
| EXAMPLE 1-2 | 0.01 | 0.01 | 0.01 | 2 | 92 | 98 | 99 | 83 | 87 |
| EXAMPLE 1-3 | 0.01 | 0.01 | 0.01 | 10 | 91 | 95 | 97 | 81 | 85 |
| EXAMPLE 2-1 | 0.01 | 0.01 | 10 | 0.01 | 93 | 94 | 97 | 80 | 92 |
| EXAMPLE 2-2 | 0.01 | 0.01 | 10 | 2 | 92 | 92 | 99 | 82 | 95 |
| EXAMPLE 2-3 | 0.01 | 0.01 | 10 | 10 | 92 | 90 | 97 | 80 | 94 |
| EXAMPLE 3-1 | 0.001 | 0.01 | 2 | 0.01 | 94 | 97 | 99 | 84 | 89 |
| EXAMPLE 3-2 | 0.001 | 0.01 | 2 | 2 | 93 | 95 | 99 | 86 | 92 |
| EXAMPLE 3-3 | 0.001 | 0.01 | 2 | 10 | 93 | 92 | 99 | 82 | 90 |
| EXAMPLE 4-1 | 0.05 | 0.01 | 2 | 0.01 | 90 | 97 | 99 | 84 | 93 |
| EXAMPLE 4-2 | 0.05 | 0.01 | 2 | 2 | 90 | 95 | 99 | 86 | 95 |
| EXAMPLE 4-3 | 0.05 | 0.01 | 2 | 10 | 90 | 92 | 99 | 82 | 93 |
| EXAMPLE 5-1 | 0.01 | 0.001 | 2 | 0.01 | 94 | 97 | 99 | 81 | 90 |
| EXAMPLE 5-2 | 0.01 | 0.001 | 2 | 2 | 94 | 95 | 99 | 85 | 94 |
| EXAMPLE 5-3 | 0.01 | 0.001 | 2 | 10 | 93 | 94 | 99 | 83 | 91 |
| EXAMPLE 6-1 | 0.01 | 0.05 | 2 | 0.01 | 95 | 97 | 99 | 82 | 90 |
| EXAMPLE 6-2 | 0.01 | 0.05 | 2 | 2 | 95 | 95 | 99 | 85 | 94 |
| EXAMPLE 6-3 | 0.01 | 0.05 | 2 | 10 | 94 | 94 | 99 | 80 | 91 |
| COMPARISON 1-1 | 0.01 | 0.01 | 2 | 0 | 93 | 97 | 99 | 76 | 86 |
| COMPARISON 1-2 | 0.01 | 0.01 | 2 | 0.005 | 93 | 97 | 99 | 77 | 86 |
| COMPARISON 1-3 | 0.01 | 0.01 | 2 | 11 | 89 | 88 | 75 | 52 | 50 |
| COMPARISON 1-4 | 0.01 | 0.01 | 2 | 12 | 89 | 88 | 71 | 50 | 45 |
| COMPARISON 2-1 | 0.01 | 0.01 | 0 | 0.01 | 93 | 100 | 73 | 44 | 80 |
| COMPARISON 2-2 | 0.01 | 0.01 | 0 | 2 | 93 | 99 | 75 | 46 | 81 |
| COMPARISON 2-3 | 0.01 | 0.01 | 0 | 10 | 91 | 96 | 80 | 50 | 80 |
| COMPARISON 3-1 | 0.01 | 0.01 | 20 | 0.01 | 90 | 65 | 72 | 42 | 80 |
| COMPARISON 3-2 | 0.01 | 0.01 | 20 | 2 | 90 | 64 | 71 | 45 | 81 |
| COMPARISON 3-3 | 0.01 | 0.01 | 20 | 10 | 90 | 60 | 76 | 50 | 81 |

SOLVENT: ETHYLENE CARBONATE (EC) + ETHYL METHYL CARBONATE (EMC)

Figure 5:
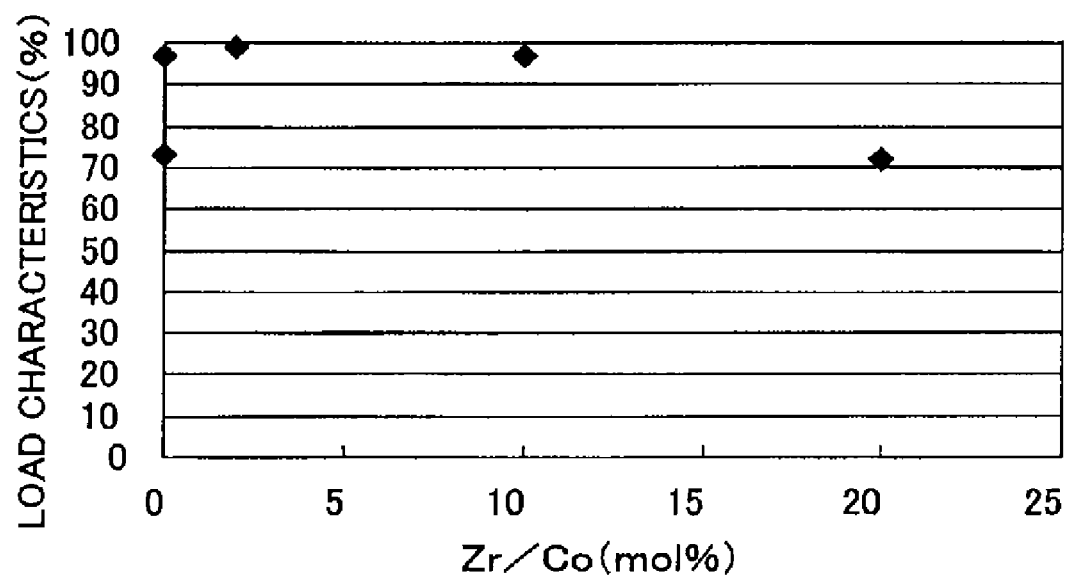
FIG. 5 is a characteristics diagram showing a relation between a content of zirconium and load characteristics.
Figure 6:
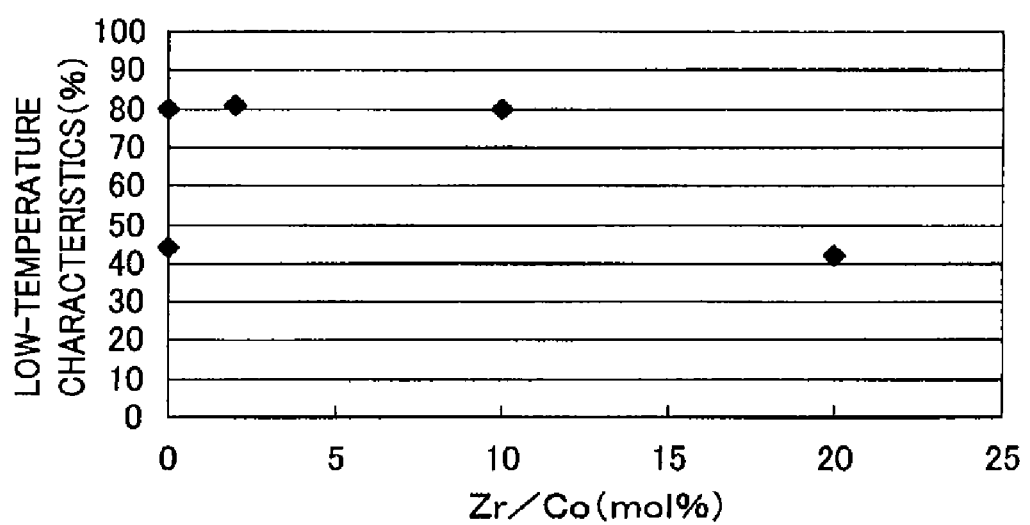
FIG. 6 is a characteristics diagram showing a relation between the content of zirconium and low-temperature characteristics.
Figure 7:
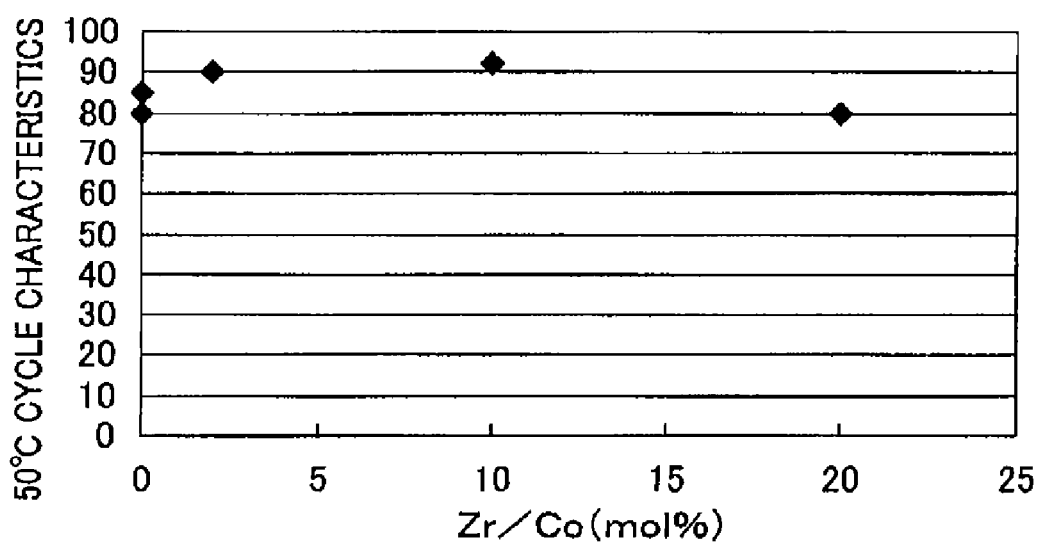
FIG. 7 is a characteristics diagram showing a relation between the content of zirconium and 50° C. cycle characteristics.

FIG. 5 is a characteristics diagram showing a relation between a content of zirconium and the load characteristics. FIG. 6 is a characteristics diagram showing a relation between the content of zirconium and the low-temperature characteristics. FIG. 7 is a characteristics diagram showing a relation between the content of zirconium and the 50° C. cycle characteristics. The characteristics diagrams shown in FIGS. 5 to 7 relate to Examples 1-1, 2-1, and 5-1 and Comparisons 2-1 and 3-1 in which the ratio of tin to cobalt is equal to 0.01 mol %.

Figure 8:
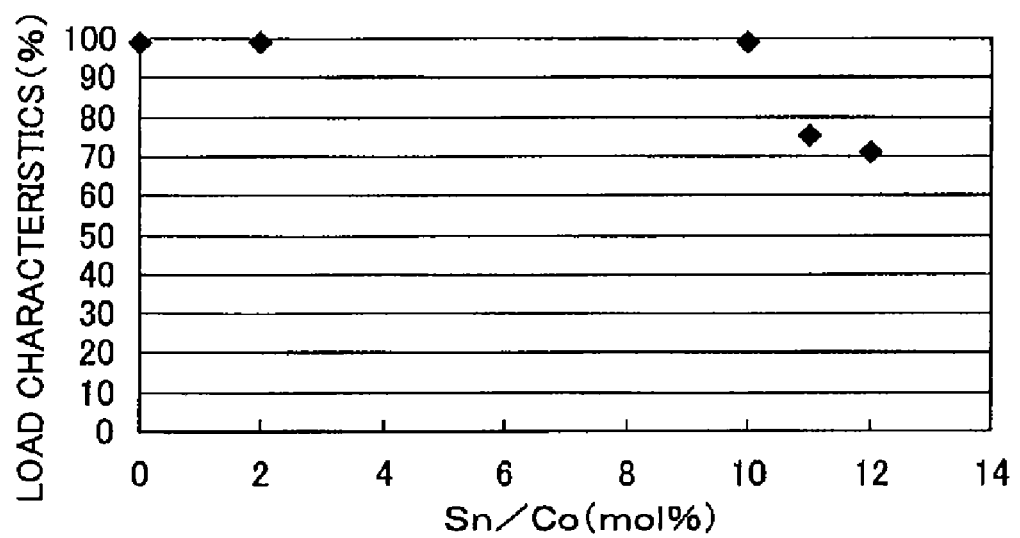
FIG. 8 is a characteristics diagram showing a relation between a content of tin and load characteristics.
Figure 9:
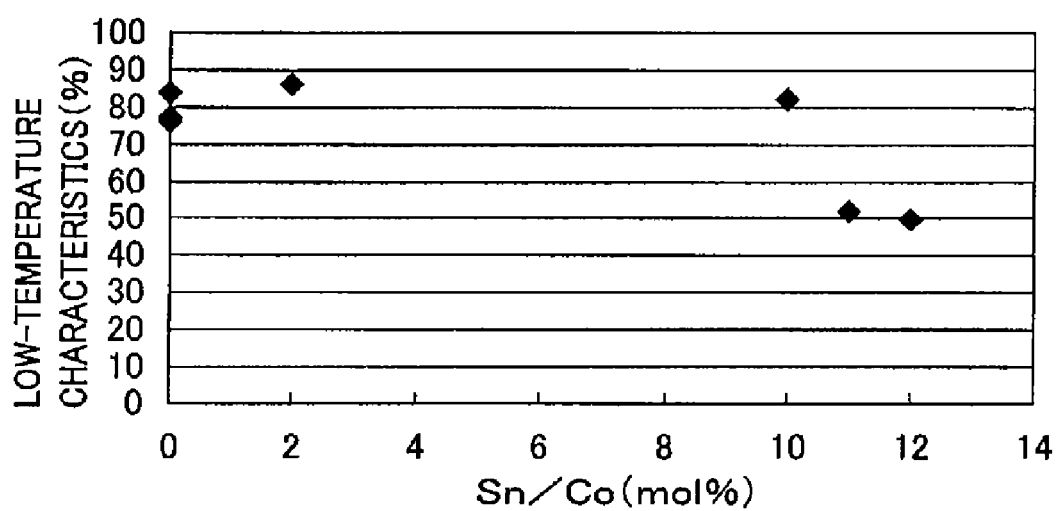
FIG. 9 is a characteristics diagram showing a relation between the content of tin and low-temperature characteristics.
Figure 10:
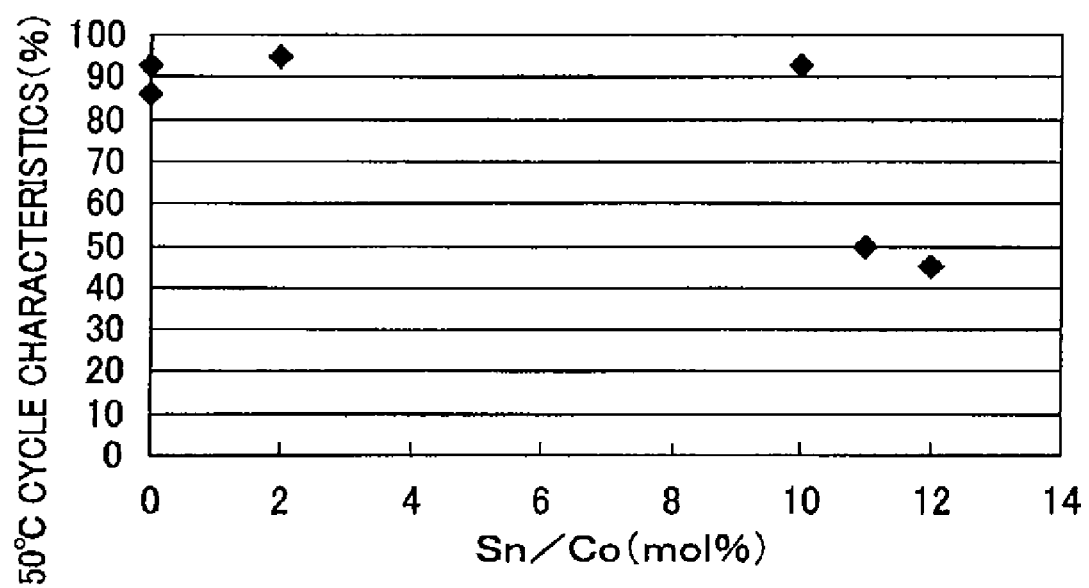
FIG. 10 is a characteristics diagram showing a relation between the content of tin and 50° C. cycle characteristics.

FIG. 8 is a characteristics diagram showing a relation between a content of tin and the load characteristics. FIG. 9 is a characteristics diagram showing a relation between the content of tin and the low-temperature characteristics. FIG. 10 is a characteristics diagram showing a relation between the content of tin and the 50° C. cycle characteristics. The characteristics diagrams shown in FIGS. 8 to 10 relate to Examples 4-1 to 4-3 and Comparisons 1-1 to 1-4 in which the ratio of zirconium to cobalt is equal to 2 mol %.

Figure 11:
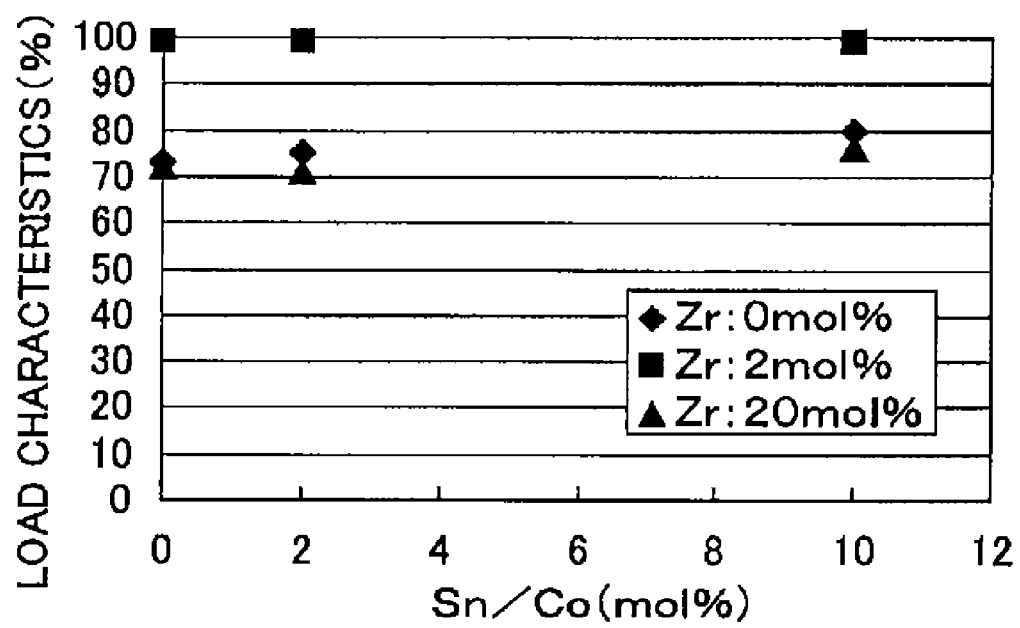
FIG. 11 is a characteristics diagram showing a relation between the content of tin and the load characteristics in the case where the content of zirconium is changed.
Figure 12:
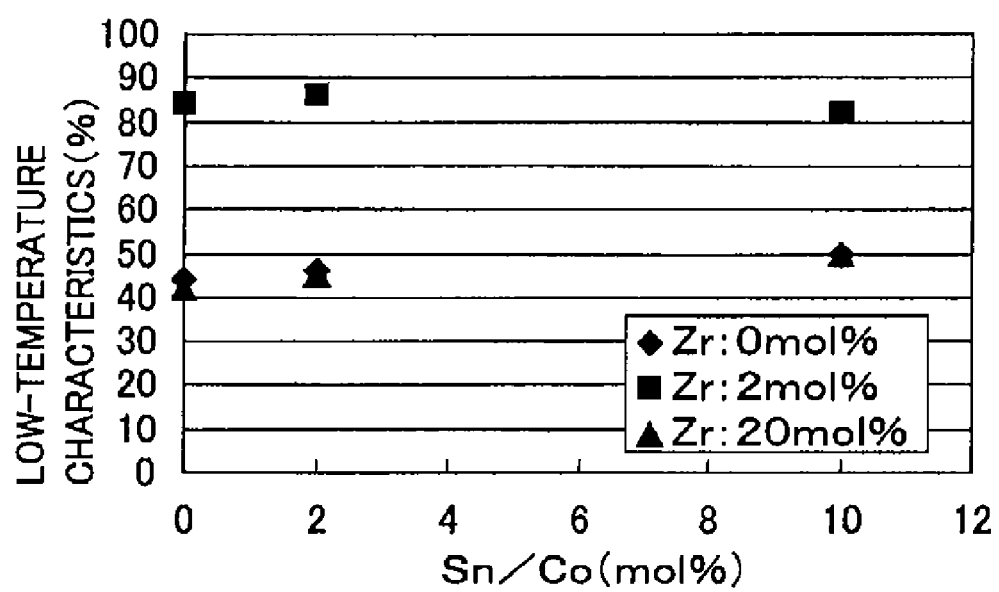
FIG. 12 is a characteristics diagram showing a relation between the content of tin and the low-temperature characteristics in the case where the content of zirconium is changed.
Figure 13:
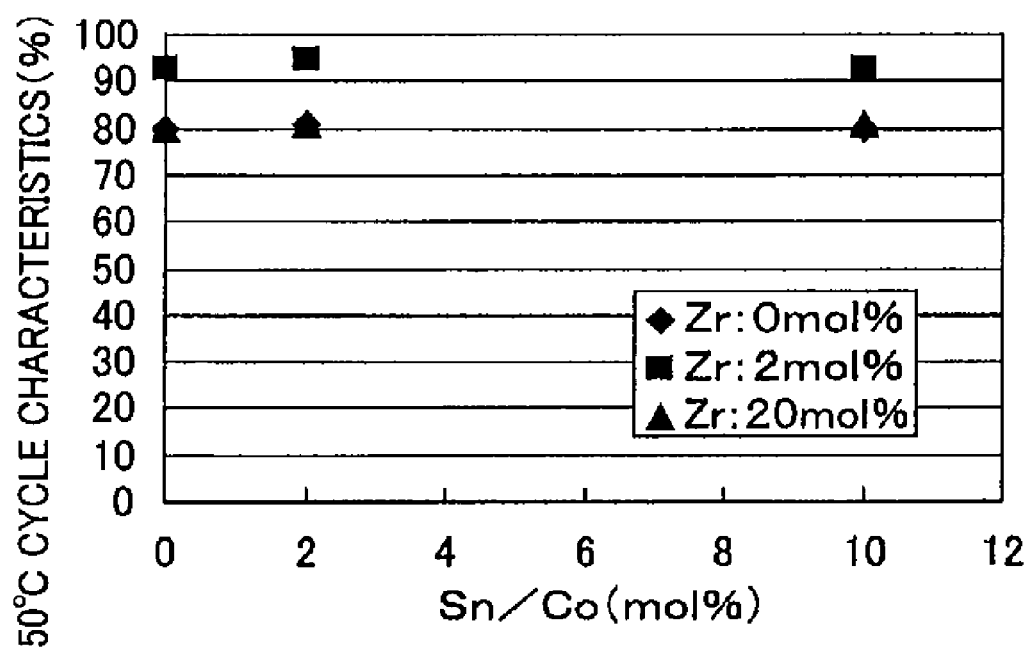
FIG. 13 is a characteristics diagram showing a relation between the content of tin and the 50° C. cycle characteristics in the case where the content of zirconium is changed.

FIG. 11 is a characteristics diagram showing a relation between the content of tin and the load characteristics in the case where the content of zirconium is changed. FIG. 12 is a characteristics diagram showing a relation between the content of tin and the low-temperature characteristics in the case where the content of zirconium is changed. FIG. 13 is a characteristics diagram showing a relation between the content of tin and the 50° C. cycle characteristics in the case where the content of zirconium is changed. In FIGS. 11 to 13, "♦" denotes the characteristics of Comparisons 2-1 to 2-3 in which the ratio of zirconium to cobalt is equal to 0 mol %. "■" denotes the characteristics of Examples 4-1 to 4-3 in which the ratio of zirconium to cobalt is equal to 2 mol %. "▲" denotes the characteristics of Comparisons 3-1 to 3-3 in which the ratio of zirconium to cobalt is equal to 20 mol %.

(Evaluation of Load Characteristics)

(a) As shown in Table 1, when the compositions of aluminum and magnesium are set to a value within a range from 0.001 or more to 0.05 or less, the good load characteristics are obtained.

(b) As shown in Table 1 and FIG. 5, if zirconium of 0.01 mol % is contained, the load characteristics are remarkably improved. If zirconium of an amount in a range from 0.01 mol % or more to 10 mol % or less is contained, the good load characteristics are almost similarly obtained. There is such a tendency that if zirconium of an amount over 10 mol % is contained, the load characteristics deteriorate.

(c) As shown in Table 1 and FIG. 8, if tin of an amount in a range from 0 mol % or more to 10 mol % or less is contained, the good load characteristics are almost similarly obtained. There is such a tendency that if tin of an amount over 10 mol % is contained, the load characteristics deteriorate extremely.

(d) As shown in Table 1 and FIG. 11, when only tin is contained, there is such a tendency that the load characteristics are improved with an increase in content of tin. However, a degree of improvement of the load characteristics is extremely smaller than that in the case where both of zirconium and tin are contained. Even in the case where both of zirconium and tin are contained, if the content of zirconium is too large, only the load characteristics similar to those in the case where only tin is contained are obtained.

(Evaluation of Low-Temperature Characteristics)

(a) As shown in Table 1, when the compositions of aluminum and magnesium are set to a value within a range from 0.001 or more to 0.05 or less, the good low-temperature characteristics are obtained.

(b) As shown in Table 1 and FIG. 6, if zirconium of 0.01 mol % is contained, the low-temperature characteristics are remarkably improved. If zirconium of an amount in a range from 0.01 mol % or more to 10 mol % or less is contained, the good low-temperature characteristics are almost similarly obtained. There is such a tendency that if zirconium of an amount over 10 mol % is contained, the low-temperature characteristics deteriorate.

(c) As shown in Table 1 and FIG. 9, if tin of 0.01 mol % is contained, the low-temperature characteristics are remarkably improved. If tin of an amount in a range from 0.01 mol % or more to 10 mol % or less is contained, the good low-temperature characteristics are almost similarly obtained. There is such a tendency that if tin of an amount over 10 mol % is contained, the low-temperature characteristics deteriorate extremely.

(d) As shown in Table 1 and FIG. 12, when only tin is contained, there is such a tendency that the low-temperature characteristics are improved with an increase in content of tin. However, a degree of improvement of the low-temperature characteristics is extremely smaller than that in the case where both of zirconium and tin are contained. Even in the case where both of zirconium and tin are contained, if the content of zirconium is too large, only the low-temperature characteristics similar to those in the case where only tin is contained are obtained.

(Evaluation of 50° Cycle Characteristics)

(a) As shown in Table 1, when the compositions of aluminum and magnesium are set to a value within a range from 0.001 or more to 0.05 or less, the good 50° cycle characteristics are obtained.

(b) As shown in Table 1 and FIG. 7, if zirconium of 0.01 mol % is contained, the 50° cycle characteristics are remarkably improved. If zirconium of an amount in a range from 0.01 mol % or more to 10 mol % or less is contained, the good 50° cycle characteristics are almost similarly obtained. There is such a tendency that if zirconium of an amount over 10 mol % is contained, the 50° cycle characteristics deteriorate.

(c) As shown in Table 1 and FIG. 10, if tin of 0.01 mol % is contained, the 50° cycle characteristics are remarkably improved. If tin of an amount in a range from 0.01 mol % or more to 10 mol % or less is contained, the good 50° cycle characteristics are almost similarly obtained. There is such a tendency that if tin of an amount over 10 mol % is contained, the 50° cycle characteristics deteriorate extremely.

(d) As shown in Table 1 and FIG. 13, when only tin is contained, even if the content of tin is increased, such a tendency that the 50° cycle characteristics are improved is not obtained. A degree of improvement of the 50° cycle characteristics is extremely smaller than that in the case where both of zirconium and tin are contained. Even in the case where both of zirconium and tin are contained, if the content of zirconium is too large, only the 50° cycle characteristics similar to those in the case where only tin is contained are obtained.

From the above evaluation, the following fact has been found. If zirconium as a first sub-component element is contained so that a ratio of the content of zirconium to cobalt lies within the range from 0.01 mol % or more to 10 mol % or less, tin as a second sub-component element is contained so that a ratio of the content of tin to cobalt lies within the range from 0.01 mol % or more to 10 mol % or less, the composition b of the first element is set to a value within the range from 0.001 or more to 0.05 or less, and the composition c of the second element is set to a value within the range from 0.001 or more to 0.05 or less, all of the load characteristics, the low-temperature characteristics, and the cycle characteristics at the high temperature can be improved.

Example 7-1

First, cobalt sulfate, zirconium sulfate, and germanium sulfate are dissolved into the pure water. A sodium hydrogencarbonate solution is added. Zirconium and germanium are coprecipitated together with cobalt carbonate. In this instance, mixture ratios of cobalt sulfate, zirconium sulfate, and germanium sulfate are adjusted. A ratio of zirconium to cobalt is set to 2 mol %. A ratio of germanium to cobalt is set to 2 mol %.

Subsequently, cobalt carbonate in which zirconium and germanium have been coprecipitated, lithium carbonate, aluminum hydroxide, and magnesium carbonate are mixed and baked, so that the cathode active material is obtained. In this instance, they are mixed so that mole ratios of (lithium:cobalt:aluminum:magnesium), that is, (x:a:b:c) in Formula 1 are equal to (0.962:0.98:0.01:0.01). The secondary battery is manufactured by processing steps similar to those in Example 1-1.

Example 7-2

First, cobalt sulfate, zirconium sulfate, and silicon sulfate are dissolved into the pure water. A sodium hydrogencarbonate solution is added. Zirconium and silicon are coprecipitated together with cobalt carbonate. In this instance, mixture ratios of cobalt sulfate, zirconium sulfate, and silicon sulfate are adjusted. A ratio of zirconium to cobalt is set to 3 mol %. A ratio of silicon to cobalt is set to 2 mol %. The secondary battery is manufactured by processing steps similar to those in Example 7-1.

Example 7-3

First, cobalt sulfate, hafnium sulfate, and tin sulfate are dissolved into the pure water. A sodium hydrogencarbonate solution is added. Hafnium and tin are coprecipitated together with cobalt carbonate. In this instance, mixture ratios of cobalt sulfate, hafnium sulfate, and tin sulfate are adjusted. A ratio of hafnium to cobalt is set to 2 mol %. A ratio of tin to cobalt is set to 2 mol %. The secondary battery is manufactured by processing steps similar to those in Example 7-1.

Example 7-4

First, cobalt sulfate, hafnium sulfate, and germanium sulfate are dissolved into the pure water. A sodium hydrogencarbonate solution is added. Hafnium and germanium are coprecipitated together with cobalt carbonate. In this instance, mixture ratios of cobalt sulfate, hafnium sulfate, and germanium sulfate are adjusted. A ratio of hafnium to cobalt is set to 3 mol %. A ratio of germanium to cobalt is set to 2 mol %. The secondary battery is manufactured by processing steps similar to those in Example 7-1.

Example 7-5

First, cobalt sulfate, hafnium sulfate, and silicon sulfate are dissolved into the pure water. A sodium hydrogencarbonate solution is added. Hafnium and silicon are coprecipitated together with cobalt carbonate. In this instance, mixture ratios of cobalt sulfate, hafnium sulfate, and silicon sulfate are adjusted. A ratio of hafnium to cobalt is set to 4 mol %. A ratio of silicon to cobalt is set to 2 mol %. The secondary battery is manufactured by processing steps similar to those in Example 7-1.

Example 7-6

First, cobalt sulfate, titanium sulfate, and tin sulfate are dissolved into the pure water. A sodium hydrogencarbonate solution is added. Titanium and tin are coprecipitated together with cobalt carbonate. In this instance, mixture ratios of cobalt sulfate, titanium sulfate, and tin sulfate are adjusted. A ratio of titanium to cobalt is set to 2 mol %. A ratio of tin to cobalt is set to 2 mol %. The secondary battery is manufactured by processing steps similar to those in Example 7-1.

Example 7-7

First, cobalt sulfate, titanium sulfate, and germanium sulfate are dissolved into the pure water. A sodium hydrogencarbonate solution is added. Titanium and germanium are coprecipitated together with cobalt carbonate. In this instance, mixture ratios of cobalt sulfate, titanium sulfate, and germanium sulfate are adjusted. A ratio of titanium to cobalt is set to 3 mol %. A ratio of germanium to cobalt is set to 2 mol %. The secondary battery is manufactured by processing steps similar to those in Example 7-1.

Example 7-8

First, cobalt sulfate, titanium sulfate, and silicon sulfate are dissolved into the pure water. A sodium hydrogencarbonate solution is added. Titanium and silicon are coprecipitated together with cobalt carbonate. In this instance, mixture ratios of cobalt sulfate, titanium sulfate, and silicon sulfate are adjusted. A ratio of titanium to cobalt is set to 4 mol %. A ratio of silicon to cobalt is set to 2 mol %. The secondary battery is manufactured by processing steps similar to those in Example 7-1.

Charging and discharging are executed with respect to the secondary batteries of Examples obtained as mentioned above and the first charging/discharging efficiency, first discharging capacitance, load characteristics, low-temperature characteristics, and cycle characteristics at 50° C. are evaluated. Evaluation results are shown in Table 2. The first discharging capacitance is shown as a relative value on the assumption that the value in Comparison 2-1 shown in Table 1 is equal to 100. An evaluating method of the first charging/discharging efficiency, first discharging capacitance, load characteristics, low-temperature characteristics, and cycle characteristics at 50° C. is similar to that used for Example 1-1 to Comparison 3-3 mentioned above.

Table 2 shows the compositions of the cathode active materials of Examples 7-1 to 7-8 and the evaluation results of the characteristics of those materials.

TABLE 2

| | Al COMPOSITION b | Mg COMPOSITION c | M3/Co (mol %) | M4/Co (mol %) | 1ST CHARGING/ DISCHARGING EFFICIENCY (%) | 1ST DISCHARGING CAPACITANCE (RELATIVE VALUE) | LOAD CHARACTERISTICS (%) | LOW-TEMPERATURE CHARACTERISTICS (%) | 50° C. CYCLE CHARACTERISTICS (%) |
|---|---|---|---|---|---|---|---|---|---|
| EXAMPLE 7-1 | 0.01 | 0.01 | Zr 2 | Ge 2 | 93 | 95 | 99 | 84 | 90 |
| EXAMPLE 7-2 | 0.01 | 0.01 | Zr 3 | Si 2 | 93 | 95 | 99 | 83 | 90 |
| EXAMPLE 7-3 | 0.01 | 0.01 | Hf 2 | Sn 2 | 94 | 95 | 99 | 84 | 90 |
| EXAMPLE 7-4 | 0.01 | 0.01 | Hf 3 | Ge 2 | 93 | 95 | 98 | 82 | 88 |
| EXAMPLE 7-5 | 0.01 | 0.01 | Hf 4 | Si 2 | 93 | 95 | 99 | 82 | 88 |

TABLE 2-continued

|  | Al COMPOSITION b | Mg COMPOSITION c | M3/Co (mol %) | M4/Co (mol %) | 1ST CHARGING/ DISCHARGING EFFICIENCY (%) | 1ST DISCHARGING CAPACITANCE (RELATIVE VALUE) | LOAD CHARACTERISTICS (%) | LOW-TEMPERATURE CHARACTERISTICS (%) | 50° C. CYCLE CHARACTERISTICS (%) |
|---|---|---|---|---|---|---|---|---|---|
| EXAMPLE 7-6 | 0.01 | 0.01 | Ti 2 | Sn 2 | 94 | 95 | 98 | 82 | 88 |
| EXAMPLE 7-7 | 0.01 | 0.01 | Ti 3 | Ge 2 | 93 | 95 | 99 | 82 | 87 |
| EXAMPLE 7-8 | 0.01 | 0.01 | Ti 4 | Si 2 | 93 | 95 | 97 | 81 | 87 |

SOLVENT; ETHYLEN CARBONATE (EC) + ETHYL METHYL CARBONATE (EMC)
M3; Zr, Hf, Ti
M4; Ge, Si, Sn (Evaluation of Characteristics)

As shown in Table 2, even in the case where germanium or silicon as a homolog element of tin is contained in place of tin, there is such a tendency that the load characteristics, low-temperature characteristics, and 50° C. cycle characteristics are improved in a manner similar to those in the case where tin is contained. Even in the case where hafnium or titanium as a homolog element of zirconium is contained in place of zirconium, there is such a tendency that the load characteristics, low-temperature characteristics, and 50° C. cycle characteristics are improved in a manner similar to those in the case where zirconium is contained.

From the above evaluation, it has been found that by containing the Group-4 element as a homolog element of zirconium and the Group-14 element as a homolog element of tin, all of the load characteristics, low-temperature characteristics, and cycle characteristics at the high temperature can be improved.

Example 8

The secondary battery is manufactured in a manner similar to Example 1-1 except that the mole ratios of (lithium:cobalt:aluminum:magnesium), that is, (x:a:b:c) in Formula 1 are set to (0.962:0.98:0.01:0.01), the ratio of zirconium to cobalt is set to 0.01 mol %, and the ratio of tin to cobalt is set to 0.01 mol %.

Comparison 4

The secondary battery is manufactured in a manner similar to Example 1-1 except that the mole ratios of (lithium:cobalt:aluminum:magnesium), that is, (x:a:b:c) in Formula 1 are set to (0.962:0.98:0.01:0.01), the ratio of zirconium to cobalt is set to 0.01 mol %, and the ratio of tin to cobalt is set to 0 mol %.

Comparison 5

The secondary battery is manufactured in a manner similar to Example 1-1 except that the mole ratios of (lithium:cobalt:aluminum:magnesium), that is, (x:a:b:c) in Formula 1 are set to (0.962:0.98:0.01:0.01), the ratio of zirconium to cobalt is set to 0 mol %, and the ratio of tin to cobalt is set to 0.01 mol %.

With respect to the secondary batteries of Examples and Comparisons obtained as mentioned above, the cycle characteristics at 23° C. and the cycle characteristics at 50° C. are evaluated. Evaluation results are shown in Table 3.

The cycle characteristics at 23° C. are obtained by the following equation (5). That is, the constant current constant voltage charging is executed at 23° C., upper limit voltages of 4.2V, 4.35V, and 4.5V, and a current of 1 C until the total of the charging time reaches three hours, thereafter, the constant current discharging is executed at 23° C., a current of 1 C, and a final voltage of 3V, and the cycle characteristics at 23° C. are obtained from the discharging capacitance at the first cycle and the discharging capacitance at the 300th cycle.

Cycle characteristics (%)=(discharging capacitance at the 300th cycle/discharging capacitance at the 1st cycle)×100     (5)

The cycle characteristics at 50° C. are obtained by the following equation (6). That is, the constant current constant voltage charging is executed at 50° C., upper limit voltages of 4.2V, 4.35V, and 4.5V, and a current of 1 C until the total of the charging time reaches three hours, thereafter, the constant current discharging is executed at 50° C., a current of 1 C, and a final voltage of 3V, and the cycle characteristics at 50° C. are obtained from the discharging capacitance at the first cycle and the discharging capacitance at the 300th cycle.

Cycle characteristics (%)=(discharging capacitance at the 300th cycle/discharging capacitance at the 1st cycle)×100     (6)

Figure 14:
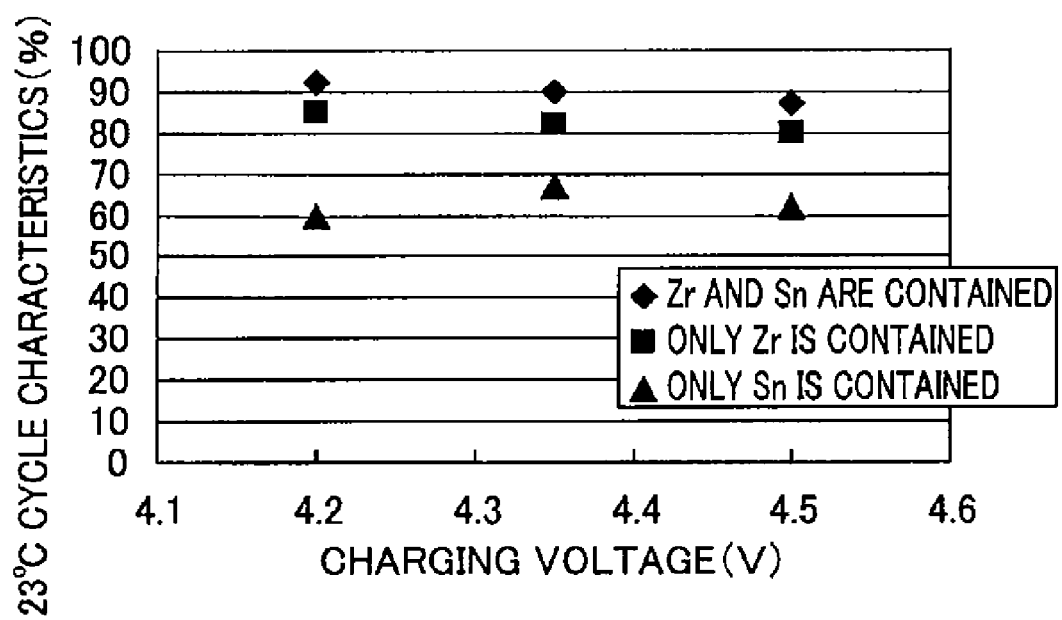
FIG. 14 is a characteristics diagram showing a relation between a battery voltage and 23° C. cycle characteristics.
Figure 15:
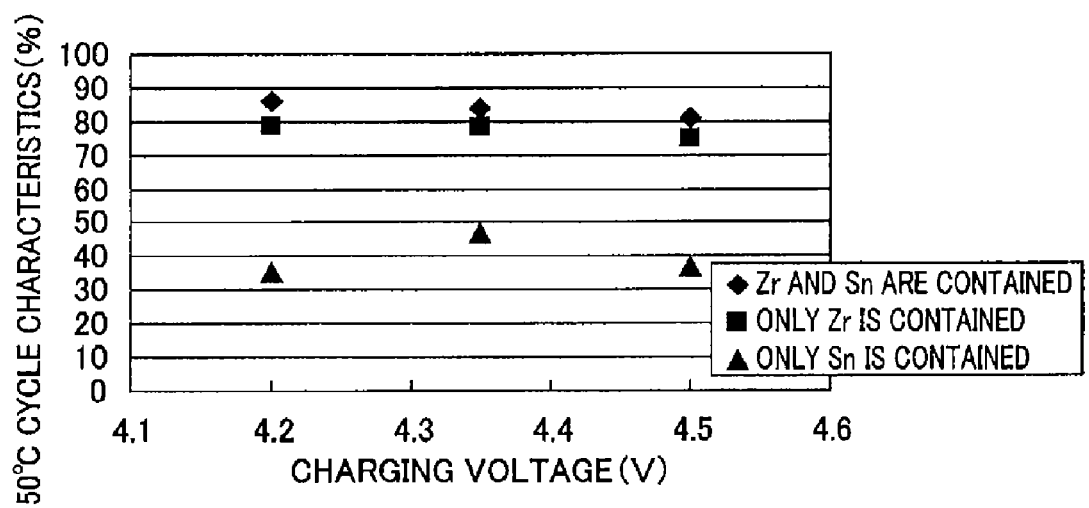
FIG. 15 is a characteristics diagram showing a relation between the battery voltage and 50° C. cycle characteristics.

Table 3 shows the compositions of the cathode active materials of Example 8 and Comparisons 4 and 5 and the evaluation results of the characteristics of those materials. FIG. 14 is a characteristics diagram showing a relation between the battery voltage and the 23° C. cycle characteristics. FIG. 15 is a characteristics diagram showing a relation between the battery voltage and the 50° C. cycle characteristics. In FIGS. 14 and 15, "♦" denotes the characteristics of Example 8 in which both of zirconium and tin are contained, "■" denotes the characteristics of Comparison 4 in which only zirconium is contained, and "▲" denotes the characteristics of Comparison 5 in which only tin is contained.

TABLE 3

|  | Al COMPOSITION b | Mg COMPOSITION c | Zr/Co (mol %) | Sn/Co (mol %) | CHARGING VOLTAGE (V) | 23° C. CYCLE CHARACTERISTICS (%) | 50° C. CYCLE CHARACTERISTICS (%) |
|---|---|---|---|---|---|---|---|
| EXAMPLE 8 | 0.01 | 0.01 | 0.01 | 0.01 | 4.2 | 92 | 86 |
| EXAMPLE 8 | 0.01 | 0.01 | 0.01 | 0.01 | 4.35 | 90 | 84 |

TABLE 3-continued

|  | Al COMPOSITION b | Mg COMPOSITION c | Zr/Co (mol %) | Sn/Co (mol %) | CHARGING VOLTAGE (V) | 23° C. CYCLE CHARACTER-ISTICS (%) | 50° C. CYCLE CHARACTER-ISTICS (%) |
|---|---|---|---|---|---|---|---|
| EXAMPLE 8 | 0.01 | 0.01 | 0.01 | 0.01 | 4.5 | 87 | 81 |
| COMPARISON 4 | 0.01 | 0.01 | 0.01 | 0 | 4.2 | 85 | 79 |
| COMPARISON 4 | 0.01 | 0.01 | 0.01 | 0 | 4.35 | 82 | 78 |
| COMPARISON 4 | 0.01 | 0.01 | 0.01 | 0 | 4.5 | 80 | 75 |
| COMPARISON 5 | 0.01 | 0.01 | 0 | 0.01 | 4.2 | 60 | 35 |
| COMPARISON 5 | 0.01 | 0.01 | 0 | 0.01 | 4.35 | 67 | 47 |
| COMPARISON 5 | 0.01 | 0.01 | 0 | 0.01 | 4.5 | 62 | 37 |

SOLVENT; ETHYLEN CARBONATE (EC) + ETHYL METHYL CARBONATE (EMC)

(Evaluation of 23° C. Cycle Characteristics)

As shown in Table 3 and FIG. 14, the 23° C. cycle characteristics of Example 8 in which both of zirconium and tin are contained are good although there is such a tendency that if the charging voltage is raised to a value within a range from 4.2V or more to 4.5V or less, the 23° C. cycle characteristics deteriorate slightly. The 23° C. cycle characteristics of Comparison 4 in which only zirconium is contained are inferior to those in the case where both of zirconium and tin are contained at a voltage within the range from 4.2V or more to 4.5V or less. Further, the 23° C. cycle characteristics of Comparison 5 in which only tin is contained are extremely inferior to those in the case where both of zirconium and tin are contained at a voltage within the range from 4.2V or more to 4.5V or less.

(Evaluation of 50° C. Cycle Characteristics)

As shown in Table 3 and FIG. 15, it has been found that although the 50° C. cycle characteristics of Example 8 and Comparisons 4 and 5 are slightly deteriorated as compared with those in the 23° C. cycle characteristics because the environmental temperature upon charging and discharging is high, a tendency similar to that in the 23° C. cycle characteristics is shown.

From the above evaluation, it has been found that when both of the first and second sub-component elements are contained, the cycle characteristics at the normal room temperature and at the high temperature can be most effectively improved.

Although the embodiments and Examples of the application have specifically been described above, the application is not limited to the foregoing embodiments and Examples but many modifications based on the technical idea of the application are possible.

For example, the numerical values mentioned in the foregoing embodiments and Examples are nothing but the examples and other numerical values different from those values may be used as necessary.

A combination of the constructions of the foregoing embodiments and Examples is possible unless otherwise departed from the spirit of the application.

Although the embodiments and Examples of the application have been described with respect to the case of using the electrolytic solution or the gel-like electrolyte as an electrolyte 36, another electrolyte may be used. As another electrolyte, a solid electrolyte having ion conductivity, a mixture of the solid electrolyte and the electrolytic solution, or a mixture of the solid electrolyte and the gel-like electrolyte can be mentioned.

As a solid electrolyte, for example, a high molecular solid electrolyte in which an electrolytic salt has been dispersed into the high molecular compound having ion conductivity or an inorganic solid electrolyte made of ion conductive glass, ionic crystal, or the like can be used. As a high molecular compound of the high molecular solid electrolyte, for example, an ether system high molecular compound such as polyethylene oxide, bridge member containing polyethylene oxide, or the like, ester system high molecular compound such as polymethacrylate or the like, or a sole body, a mixture, or a copolymer of an acrylate system high molecular compound can be used. As an inorganic solid electrolyte, an electrolyte containing lithium nitride, lithium phosphate, or the like can be used.

Although the embodiments and Examples of the application have been described with respect to the case where the battery element has been wound, the application can be also similarly applied to the case of a battery having a card-shaped battery element in which the cathode and the anode have been laminated through the separator and the electrolyte, the case of a battery having a laminate type battery element in which two or more cathodes and anodes have alternately been laminated through the separator and the electrolyte, or the case of a battery having a laminate type battery element in which the cathode and the anode have been laminated through the separator and the electrolyte layer in a zigzag pattern.

Further, although the embodiments and Examples of the application have been described with respect to the case of using the film-like sheathing member 41, the application can be also applied to a secondary battery of, for example, a cylindrical type, a rectangular type, a coin type, or a button type using a sheathing member of a container made of a metal. In this case, a similar effect can be also obtained. In addition, the application is not limited to the secondary battery but can be also applied to a primary battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A cathode active material containing: a lithium cobalt composite oxide containing lithium, cobalt, a first element, and a second element; a first sub-component element; and a second sub-component element, wherein said first element is at least one kind selected from the group consisting of aluminum, chromium, vanadium, manganese, and iron, said second element is at least one kind selected from the group consisting of magnesium and calcium, said first sub-component element is at least one kind selected from the group consisting of titanium, zirconium, and hafnium, said second sub-component element is at least one kind selected from the group consisting of silicon, germanium, and tin, when a composition of cobalt is expressed as a, a composition of the first element as b, and a composition of the second element as c, mole ratios of cobalt, the first element, and the second element in said lithium cobalt composite oxide lie within ranges of $0.9 \leq a \leq 1$, $0.001 \leq b \leq 0.05$, and $0.001 \leq c \leq 0.05$, respectively, a content of said first sub-component element lies within a range from 0.01 mol % or more to 10 mol % or less as a ratio of said first sub-component element to cobalt in said lithium cobalt composite oxide, and a content of said second sub-component element lies within a range from 0.01 mol % or more to 10 mol % or less as a ratio of said second sub-component element to cobalt in said lithium cobalt composite oxide, wherein at least some of said first sub-component element exists in a crystal grain boundary of the lithium cobalt composite oxide as a first compound selected from the group consisting of: a compound containing oxygen, and a compound containing oxygen and lithium; and at least some of said second sub-component element exists in a crystal grain boundary of the lithium cobalt composite oxide as a second compound selected from the group consisting of: a compound containing oxygen, and a compound containing oxygen and lithium.

2. The material according to claim 1, wherein said lithium cobalt composite oxide is expressed by the following Formula 1: $Li_xCo_aM1_bM2_cO_2$ (Formula 1) where, M1 denotes the first element, M2 indicates the second element, x is set to a value within a range of $0.9 \leq x \leq 1.1$, a is set to a value within a range of $0.9 \leq a \leq 1$, b is set to a value within a range of $0.001 \leq b \leq 0.05$, c is set to a value within a range of $0.001 \leq c \leq 0.05$, and $a+b+c=1$.

3. The material according to claim 1, wherein a particle size of the cathode active material at a frequency 50% of a particle size distribution curve ranges from 5 μm or more to 30 μm or less and a specific surface area of the cathode active material is within a range from 0.1 $m^2/g$ or more to 1.5 $m^2/g$ or less.

4. The material according to claim 1, wherein the cathode active material consists of the lithium cobalt composite oxide, the first sub-component element, the second sub-component element, the first compound, and the second compound.

5. A battery comprising a cathode, an anode, and an electrolyte, wherein said cathode contains a cathode active material, said cathode active material contains: a lithium cobalt composite oxide containing lithium, cobalt, a first element, and a second element; a first sub-component element; and a second sub-component element, said first element is at least one kind selected from the group consisting of aluminum, chromium, vanadium, manganese, and iron, said second element is at least one kind selected from the group consisting of magnesium and calcium, said first sub-component element is at least one kind selected from the group consisting of titanium, zirconium, and hafnium, said second sub-component element is at least one kind selected from the group consisting of silicon, germanium, and tin, when a composition of cobalt is expressed as a, a composition of the first element as b, and a composition of the second element as c, mole ratios of cobalt, the first element, and the second element in said lithium cobalt composite oxide lie within ranges of $0.9 \leq a \leq 1$, $0.001 \leq b \leq 0.05$, and $0.001 \leq c \leq 0.05$, respectively, a content of said first sub-component element lies within a range from 0.01 mol % or more to 10 mol % or less as a ratio of said first sub-component element to cobalt in said lithium cobalt composite oxide, and a content of said second sub-component element lies within a range from 0.01 mol % or more to 10 mol % or less as a ratio of said second sub-component element to cobalt in said lithium cobalt composite oxide, wherein at least some of said first sub-component element exists in a crystal grain boundary of the lithium cobalt composite oxide as a first compound selected from the group consisting of: a compound containing oxygen, and a compound containing oxygen and lithium; and at least some of said second sub-component element exists in a crystal grain boundary of the lithium cobalt composite oxide as a second compound selected from the group consisting of: a compound containing oxygen, and a compound containing oxygen and lithium.

6. The battery according to claim 5, wherein said lithium cobalt composite oxide is expressed by the following Formula 1: $Li_xCo_aM1_bM2_cO_2$(Formula 1) where, M1 denotes the first element, M2 indicates the second element, x is set to a value within a range of $0.9 \leq x \leq 1.1$, a is set to a value within a range of $0.9 \leq a \leq 1$, b is set to a value within a range of $0.001 \leq b \leq 0.05$, c is set to a value within a range of $0.001 \leq c \leq 0.05$, and $a+b+c=1$.

7. The battery according to claim 5, wherein a particle size of the cathode active material at a frequency 50% of a particle size distribution curve ranges from 5 μm or more to 30 μm or less and a specific surface area of the cathode active material is within a range from 0.1 $m^2/g$ or more to 1.5 $m^2/g$ or less.

8. The battery according to claim 5, wherein the cathode active material consists of the lithium cobalt composite oxide, the first sub-component element, the second sub-component element, the first compound, and the second compound.

* * * * *